United States Patent
Takano et al.

[11] Patent Number: 6,076,366
[45] Date of Patent: Jun. 20, 2000

[54] REFRIGERATING CYCLE SYSTEM WITH HOT-GAS BYPASS PASSAGE

[75] Inventors: Yoshiaki Takano, Kosai; Satoshi Izawa; Hajime Ito, both of Kariya; Hikaru Sugi, Nagoya, all of Japan

[73] Assignee: Denso Corporation, Kariya, Japan

[21] Appl. No.: 09/276,847

[22] Filed: Mar. 26, 1999

[30] Foreign Application Priority Data

| Apr. 3, 1998 | [JP] | Japan | 10-091832 |
| May 8, 1998 | [JP] | Japan | 10-126290 |
| Jan. 28, 1999 | [JP] | Japan | 11-020517 |
| Jan. 28, 1999 | [JP] | Japan | 11-020518 |

[51] Int. Cl.$^7$ ................................................ F25B 41/00
[52] U.S. Cl. .................................. 62/196.4; 62/196.1
[58] Field of Search ............................... 62/196.1, 196.4

[56] References Cited

U.S. PATENT DOCUMENTS

| 4,884,413 | 12/1989 | Quandt et al. ........................ 62/135 |
| 5,065,584 | 11/1991 | Byczynski et al. ...................... 62/81 |
| 5,291,941 | 3/1994 | Enomoto et al. . |
| 5,355,689 | 10/1994 | Hara et al. ........................... 62/159 |
| 5,419,149 | 5/1995 | Hara et al. ........................... 62/160 |
| 5,946,925 | 9/1999 | Williams et al. ..................... 62/196.4 |
| 5,970,731 | 10/1999 | Hare et al. .......................... 62/196.4 |
| 5,979,172 | 11/1999 | Teller .................................. 62/305 |
| 5,987,907 | 11/1999 | Morimoto et al. .................... 62/212 |
| 5,996,362 | 12/1999 | Likitcheva .......................... 62/174 |

*Primary Examiner*—Henry Bennett
*Assistant Examiner*—Mark Shulman
*Attorney, Agent, or Firm*—Harness, Dickey & Pierce, PLC

[57] ABSTRACT

A decompressing device for decompressing refrigerant that is discharged from a compressor is provided at an inlet of a hot-gas bypass passage. The refrigerant flows in the hot-gas bypass passage after being decompressed by the decompressing device to bypass a condenser at a heating mode. In this case, because the refrigerant flows in the hot-gas bypass passage with a temperature that is lowered by the decompression, heat loss at a pipe portion of the hot-gas bypass passage is effectively decreased.

24 Claims, 17 Drawing Sheets

FIG. 4
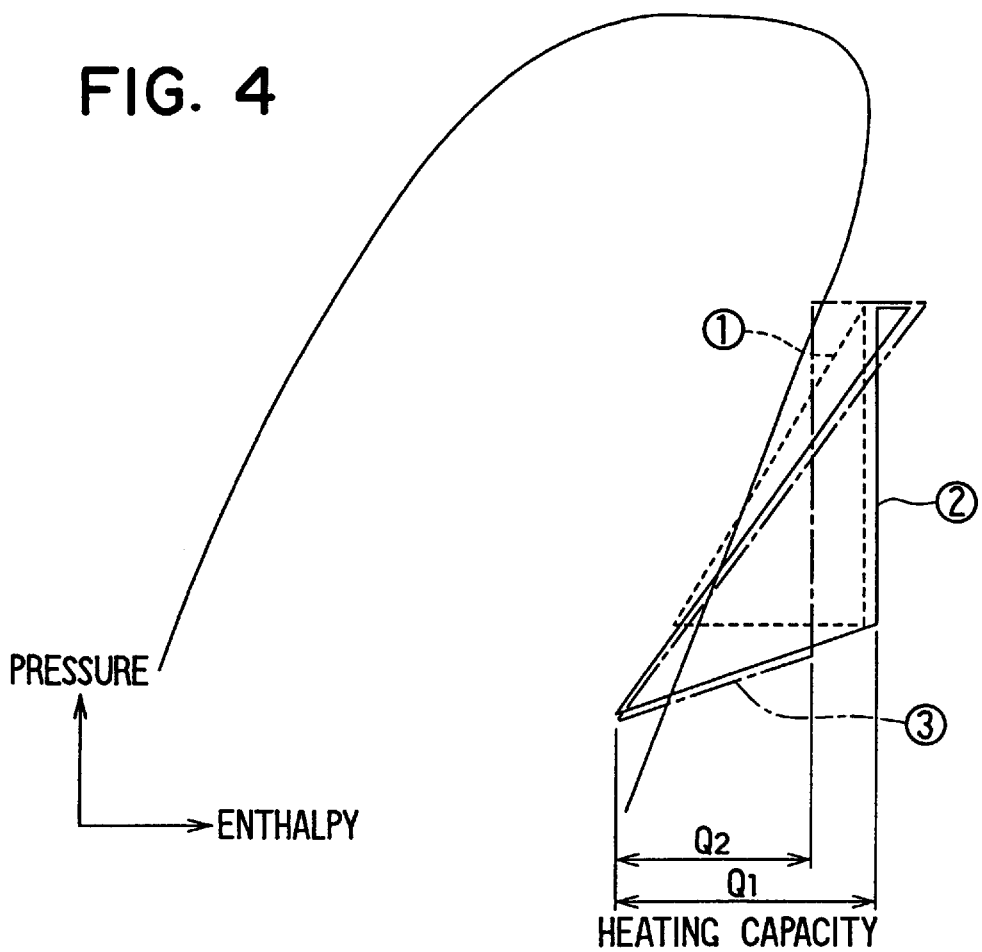
FIG. 5  −20°C, 40 km/h TRAVEL
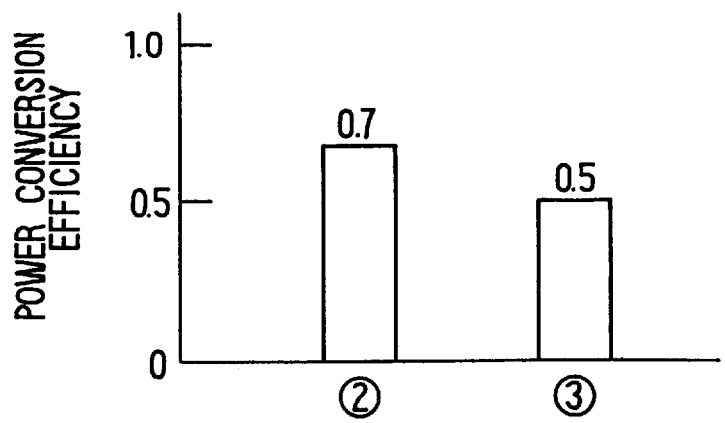

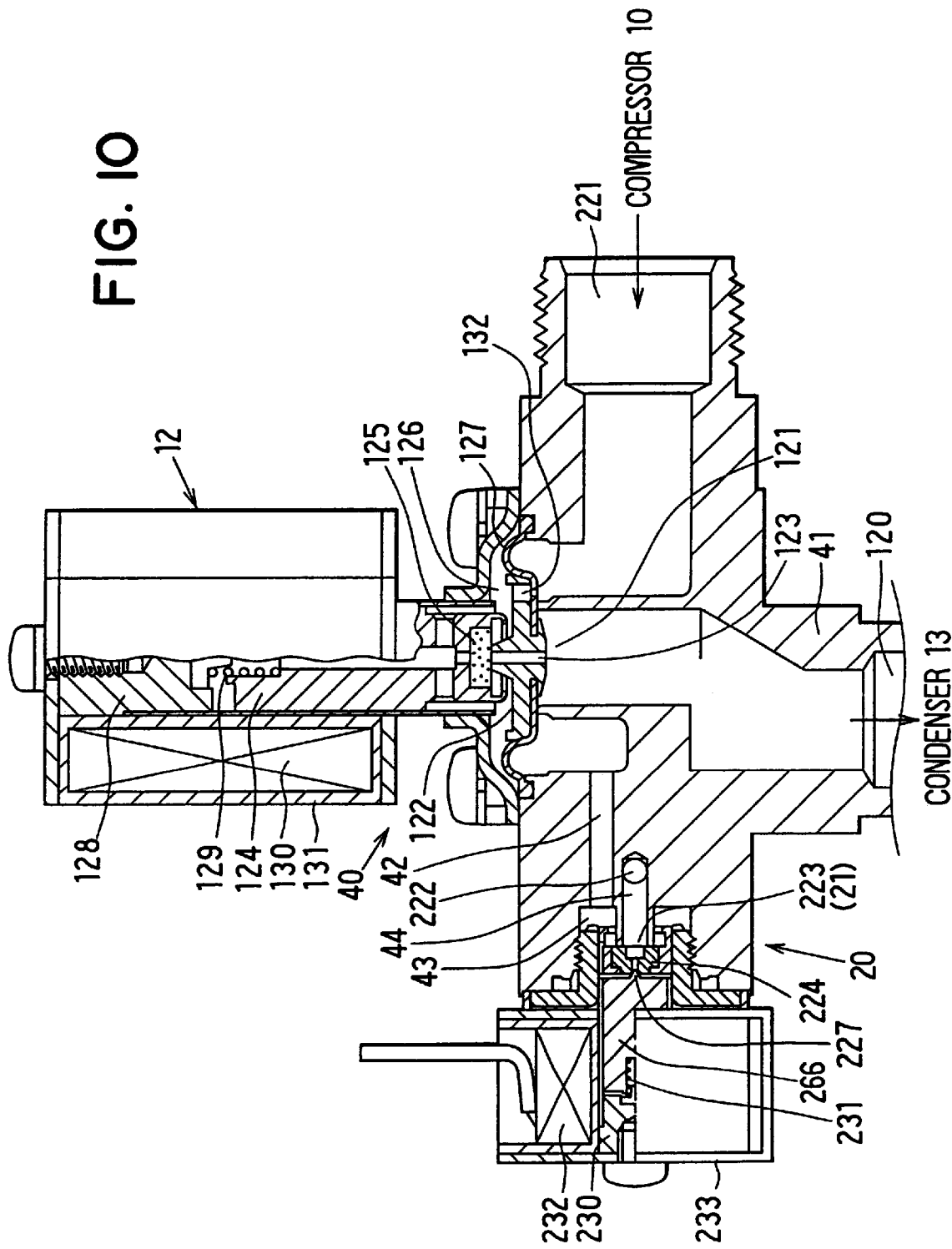

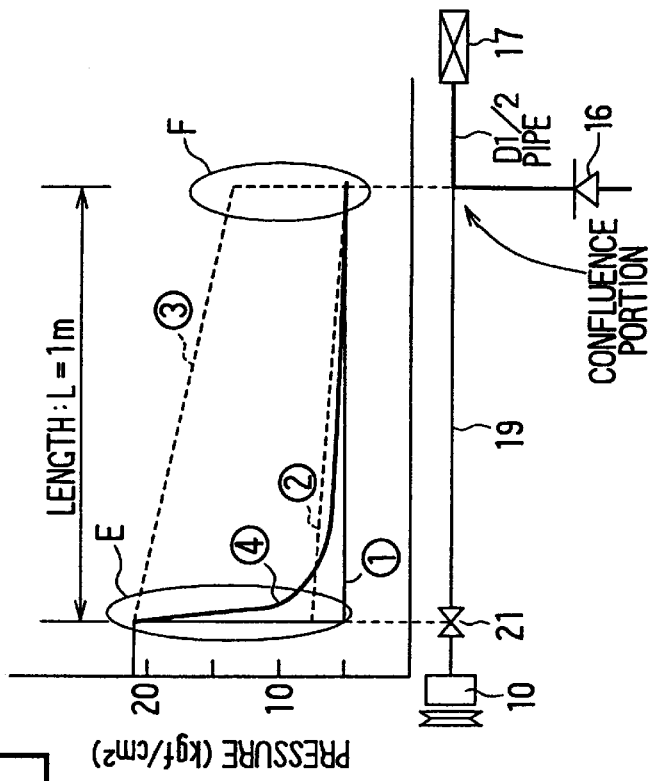
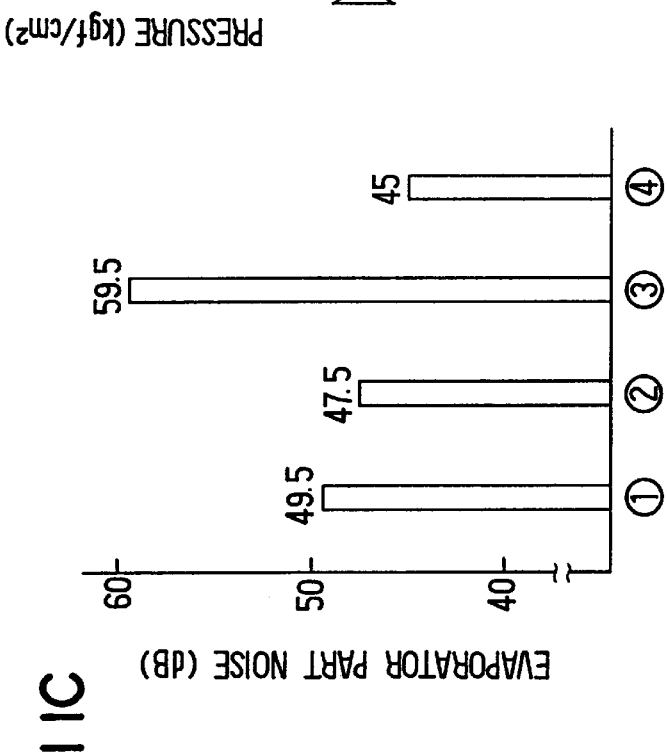
FIG. 11A
FIG. 11B
FIG. 11C

FIG. 24

○ POSSIBLE   × IMPOSSIBLE

| SWITCH VALVE OPERATION | | VALVE OF FIG. 10 | VALVE OF FIG. 22 | OPERATIONAL MODE |
|---|---|---|---|---|
| CONDENSER SIDE | BYPASS SIDE | | | |
| OPEN | SHUT | ○ | ○ | COOLING OPERATION |
| SHUT | OPEN | ○ | ○ | HOT-GASS OPERATION |
| SHUT | SHUT | ○ | × | — |
| OPEN | OPEN | ○ | × | REFRIGERANT AMOUNT ADJUSTMENT |

REFRIGERATING CYCLE SYSTEM WITH HOT-GAS BYPASS PASSAGE

CROSS REFERENCE TO RELATED APPLICATIONS

This application is based upon and claims the benefit of Japanese Patent Applications No. 10-91832 filed on Apr. 3, 1998, No. 10-126290 filed on May 8, 1998, No. 11-20517 filed on Jan. 28, 1999, and No. 11-20518 filed on Jan. 28, 1999, the contents of which are incorporated herein by reference.

BACKGROUND OF THE INVENTION

1. Field of the Invention

This invention relates to a refrigerating cycle system suitable for an automotive air conditioner, which includes a hot-gas bypass for introducing gaseous refrigerant (hot gas), discharged from a compressor, directly into an evaporator while bypassing a condenser at a heating state so that the gaseous refrigerant radiates heat in the evaporator.

2. Description of the Related Art

In a conventional automotive air conditioner, hot water (engine cooling water) is circulated in a heat exchanger for heating at a winter season heating state, and air is heated by exchanging heat with the hot water in the heat exchanger. In this sytem, there is a case where hot water does not have a temperature sufficient for raising the temperature of air, which is to be blown into a compartment, up to a desired level. This results in insufficient heating capacity.

To solve this problem, JP-A-5-223357 proposes a refrigerating cycle system using a hot-gas bypass so as to enhance the heating capacity. Specifically, a hot-gas bypass passage is provided so that gaseous refrigerant (hot gas) that is discharged from a compresser pypasses a condenser and directly communicates with an evaporator, and a decompressing part is provided in the hot-gas bypass passage. Accordingly, even when a hot water temperature is lower than a specific temperature as in an engine starting state, gaseous refrigerant can be directly introduced into the evaporator after being decompressed by the decompressing part in the hot-gas bypass passage so that heat is radiated from gaseous refrigerant toward air in the evaporator.

In the system described above, an amount of work of compression in the compressor is ideally transformed into a radiation amount (heating capacity) in the evaporator. Therefore, a heat loss amount (radiation amount) radiated toward an outside through a pipe that defines therein the hot-gas bypass passage directly lessens the heating capacity. Especially, in a winter season, there arises a large difference between a temperature of gaseous refrigerant immediately after discharged from the compressor, which can, for instance, be 70° C. at a discharge pressure of 20 kgf/cm$^2$, and an outside air temperature, which can, for instance, be −20° C. Therefore, the longer the pipe length of the hot-gas bypass passage in which refrigerant flows before decompression becomes, the more the heat loss amount of gaseous refrigerant in the hot-gas bypass passage is increased.

In addition, when refrigerant has a temperature of 70° C. and a pressure of 20 kgf/cm$^2$ immediately after discharged from the compressor, under a condition with an outside air temperature of −20° C., the refrigerant can have the temperature of 40° C. and a pressure of 2 kgf/cm$^2$ after decompressed by the decompressing part in the hot-gas bypass passage and have a temperature of −10° C. and a pressure of 1 kgf/cm$^2$ at the outlet side of the evaporator.

To the contrary, because the condenser is exposed to an ambient atmosphere with a temperature of −20° C., a temperature of refrigerant is cooled down to −20° C. to be equal to the ambient temperature, within the condenser, and accordingly refrigerant is transformed into a liquid state with a saturation pressure (0.5 kgf/cm$^2$G) that corresponds to the temperature. Therefore, refrigerant immediately after decompressed by the decompressing part in the hot-gas bypass passage has a high temperature and a high pressure as compared to those of refrigerant within the condenser. Consequently, refrigerant tends to flow from the hot-gas bypass passage into the condenser.

To solve this problem, in the above-described system, a check valve is disposed on an outlet side of a receiver that is disposed on the outlet side of the condenser. However, in an automotive air conditioner, the condenser and the receiver are usually installed in an engine room fore most portion (ahead of a radiator). Therefore, when the check valve is provided adjacently to the receiver, it is necessary to provide a relatively long pipe for connecting a confluence point between the evaporator and the hot-gas bypass passage outlet portion and the check valve. As a result, liquid refrigerant gathers within the pipe between the confluence point and the check valve. This causes shortage of a refrigerant amount circulating when the hot-gas bypass passage is opened, resulting in deterioration of the heating capacity and an abnormal increase in temperature of gaseous refrigerant discharged from the compressor. In addition, the check valve along the refrigerant pipe requires an exclusive joint, resulting in increased cost.

SUMMARY OF THE INVENTION

The present invention has been made in view of the above problems. An object of the present invention is to reduce heat loss of refrigerant in a hot-gas bypass passage. Another object of the present invention is to prevent gas flow noise, which is generated in the hot-gas bypass passage during decompression, from being transmitted to an evaporator. Still another object of the present invention is to prevent back flow of refrigerant, which is discharged from a hot-gas bypass passage, toward a condenser with a check valve at low cost.

According to the present invention, a refrigerating cycle system includes a first decompressing part for decompressing refrigerant that is condensed by a condenser, a second decompressing part for decompressing refrigerant that is discharged from a compressor, and a valve member for switching refrigerant flows into the first decompressing part and into the second decompressing part. The second decompressing part is provided at an inlet of a hot-gas bypass passage.

Accordingly, the refrigerant discharged from the compressor flows in the hot-gas bypass passage after being decompressed by the second decompressing part. Therefore, heat loss at a pipe portion of the hot-gas bypass passage is effectively reduced. Because the second decompressing part is provided at the inlet of the hot-gas bypass passage so as to make a relatively long distance from the evaporator that is usually installed within an automotive compartment, even when gas flow noise is produced due to decompression of the refrigerant, it becomes difficult for the gas flow noie to be transmitted into the compartment.

Preferably, the valve member is dispsoed at the inlet of the hot-gas bypass passage and includes the second decompressing part. This results in low cost. Preferably, a gas flow noise suppression member is disposed at an outlet portion of the second decompressing part so that the refrigerant flowing out from the second decompressing part hits against the gas flow noise suppression member to reduce noise therefrom.

When the refrigerating cycle system of the present invention is applied to an automotive air conditioner, the evaporator is accommodated in an air conditioning unit that is disposed within a compartment of a vehicle, and the second decompressing part is disposed within an engine room of the vehicle. In this case, it is difficult for the gas flow noise generated by the second decompressing part to be transmitted toward the evaporator, thereby reducing noise in the compartment. More preferably, the compressor is disposed within the engine room to be driven by an engine of the vehicle, and the hot-gas bypass passage is disposed at a position to which heat is transmitted from the engine. Accordingly, the hot-gas bypass passage receives the heat from the engine to reduce the heat loss therefrom.

Prefeably, a check valve for preventing the refrigerant from the hot-gas bypass passage from reversely flowing toward the condenser is provided in the first decompressing part, or at a portion selected from a downstream side immediately after the first decompressing part and an upstream side immediately before the first decompressing part. The first decompressing part is composed of, for instance, an expansion valve, and in this case, the check valve disposed in the first decompressing part means the check valve unified with the expansion valve.

Accordingly, the refrigerant is prevented from reversely flowing into a pipe on the upstream side of the first decompressing part and being transformed into liquid in the pipe, at low cost. The check valve is more preferably disposed with a moving direction in which the check valve moves to be closed and in which at least part of a self-weight of the check valve is applied. As a result, the check valve is securely closed to enhance the effect described above.

BRIEF DESCRIPTION OF THE DRAWINGS

Other objects and features of the present invention will become more readily apparent from a better understanding of the preferred embodiments described below with reference to the following drawings.

FIG. 4 shows Mollier charts for explaining effects in the first embodiment;

FIG. 5 is a graph showing power onversion efficiency of the first embodiment and a comparative example;

FIG. 10 is a cross-sectional view showing a valve unit in the second embodiment;

FIG. 11A is a table showing constitutions of hot-gas bypass passages in a third preferred embodiment;

FIG. 11B is a graph showing relationships between the constitutions of the hot-gas bypass passages shown in FIG. 11A and changes in pressure of refrigerant in the hot-gas bypass passages;

FIG. 11C is a graph showing a relationship between evaporator part noise levels and the constitutions of the hot-gas bypass passages shown in FIG. 11A;

FIG. 24 is a table indicating switch valve operations in the seventh embodiment.

DETAILED DESCRIPTION OF THE PREFERRED EMBODIMENTS (First Embodiment)

Figure 1:
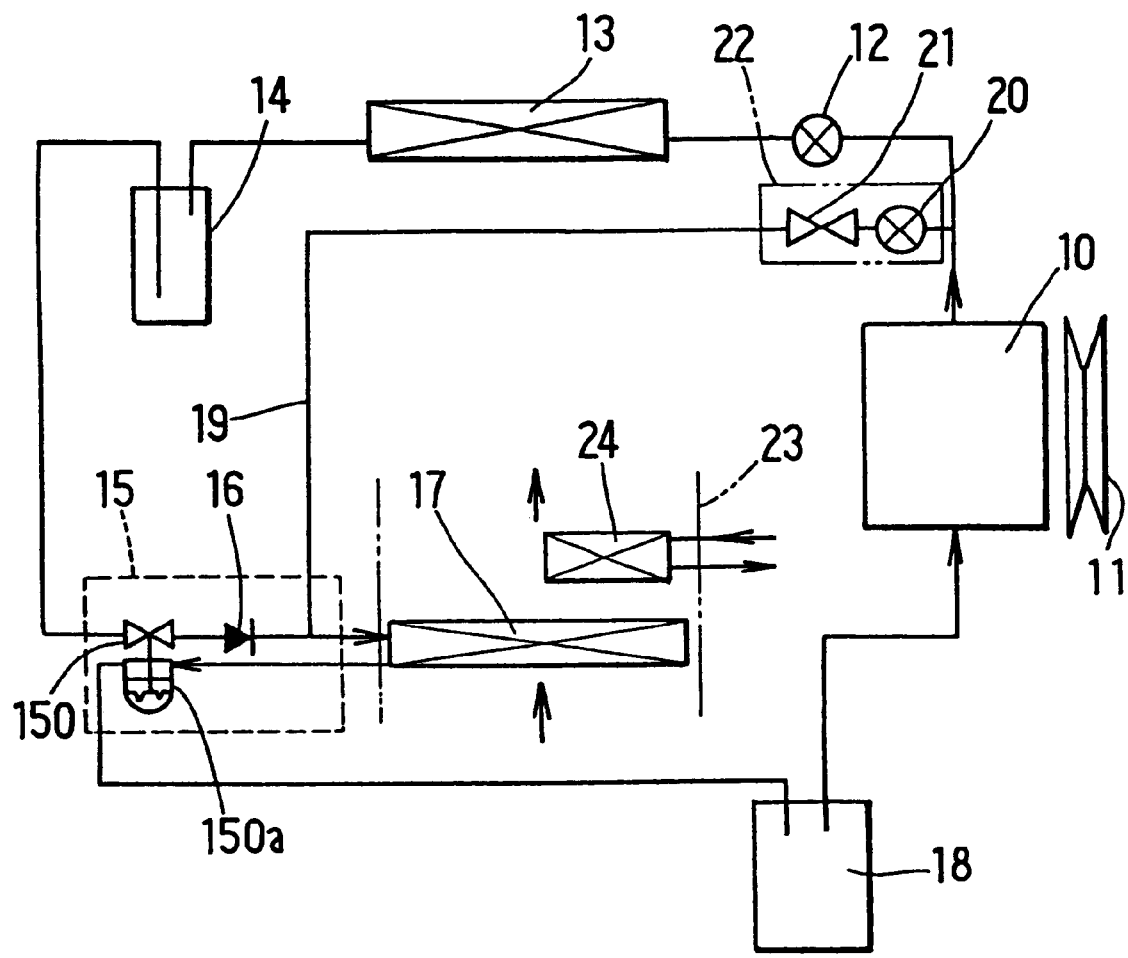
FIG. 1 is a diagram showing a refrigerating cycle system in a first preferred embodiment.

A refrigerating cycle system in a first preferred embodiment will be explained referring to FIGS. 1 to 3. In FIG. 1, a compressor 10 is driven by an water cooled automotive engine (not shown) via an electromagnetic clutch 11. A discharge side of the compressor 10 is connected to a condenser 13 via a first electromagnetic valve 12 for cooling, and an outlet side of the condenser 13 is connected to a receiver 14 for separating refrigerant into liquid and gaseous refrigerant and for storing the separated liquid refrigerant therein.

An outlet side of the receiver 14 is connected to a thermostatic expansion valve (first decompressing device) 15. The thermostatic expansion valve 15 integrally includes a check valve 16, which is connected to an inlet side of an evaporator 17, on an outlet side thereof. An expansion valve main portion 150 is to control an opening degree (refrigerant flow amount) of the expansion valve 15 so that an overheating degree of refrigerant is kept at a specific value at an outlet side of the evaporator 17 at an ordinal refrigerating cycle operation state. The outlet side of the evaporator 17 is further connected to an inlet side of an accumulator 18 through a temperature sensing part 150a of the expansion valve main portion 150. The accumulator 18 separates refrigerant into liquid and gaseous refrigerants, stores liquid refrigerant therein, and conducts gaseous refrigerant to a suction side of the compressor 10.

Further, a hot-gas bypass passage 19 is provided to directly connect the discharge side of the compressor 10 and the inlet side of the evaporator 17 (outlet side of the check valve 16) while bypassing the condenser 13 and other members. A valve unit 22 that includes a second electromagnetic valve 20 for heating and a throttling part (second decompressing device) 21 unified with one another is disposed in an inlet portion of the bypass passage 19.

The evaporator 17 is disposed within a casing of an air conditioning unit 23 of an automotive air conditioner, and cools air (air inside or outside a compartment) blown from a blower (not shown) at a cooling mode or at a dehumidifying state. At a winter season heating mode, the evaporator 17 serves as a radiator into which high temperature refrigerant gas (hot gas) is conducted from the hot-gas bypass passage 19 to heat air. A hot water type heat exchanger 24, which is for heating air using hot water (engine cooling water) from the automotive engine as a heat source, is further disposed within the casing of the air conditioning unit 23 on the air downstream side of the evaporator 17. Conditioned air passing through the heat exchanger 24 is blown out into the compartment from an air outlet (not shown) provided on the air downstream side of the heat exchanger 24.

Figures 2A, 2B:
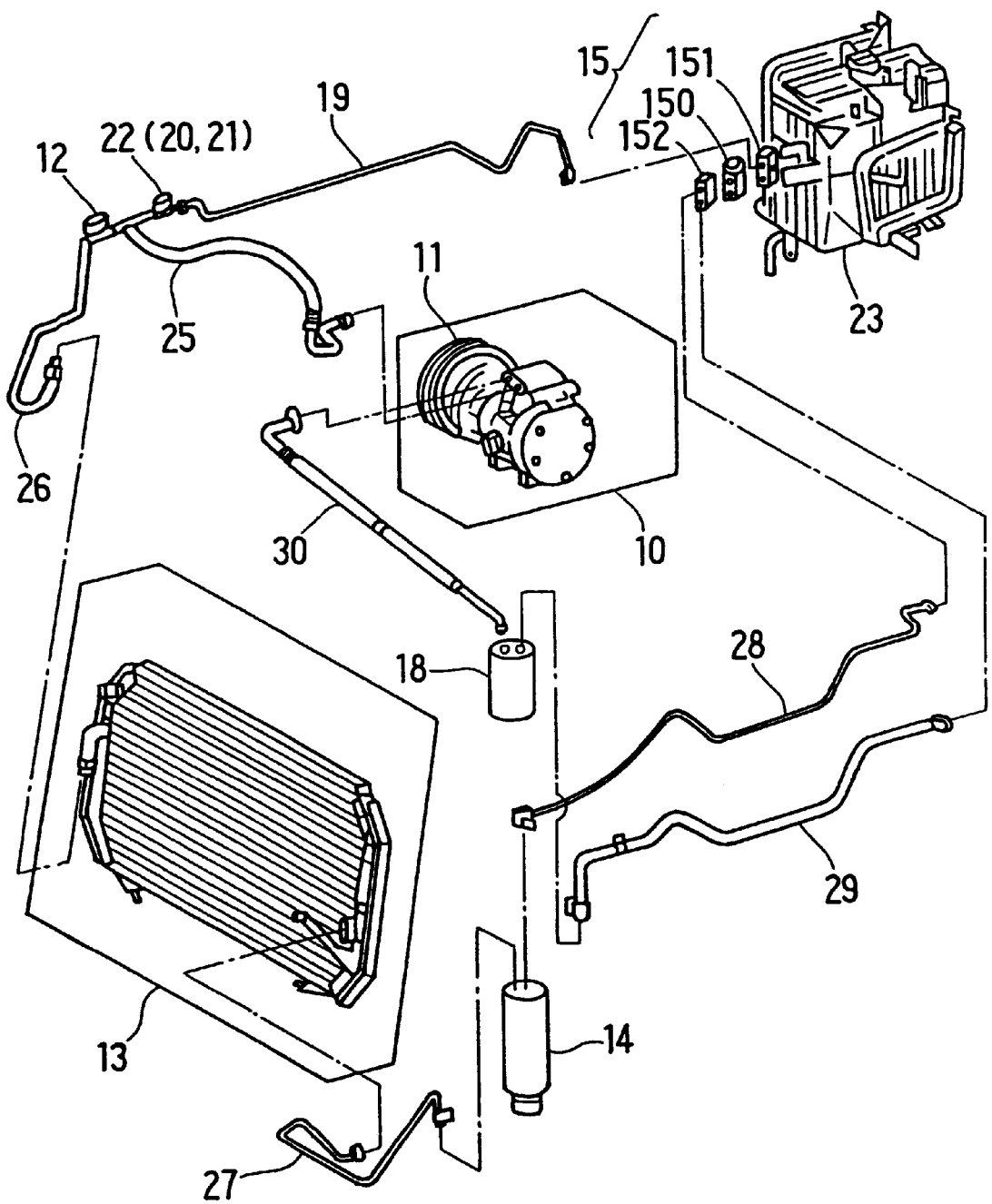
FIG. 2A is an exploded perspective view showing the refrigerating cycle system that is mounted on a vehicle in the first embodiment.
FIG. 2B is a cross-sectional view showing a pipe of a hot-gas bypass passage in the first embodiment.

FIG. 2A shows a state where the refrigerating cycle system is installed in a vehicle. The air conditioning unit 23 accommodating the evaporator 17 therein is disposed at a lower portion of an instrument panel in a compartment front portion, and the other parts are disposed within an automotive engine room. In FIG. 2A, a rubber hose 25 is connected to the discharge side of the compressor 10. A high-pressure metallic pipe 26 connects the first electromagnetic valve 12 and the condenser 13, a high-pressure metallic pipe 27 connects the condenser 13 and the receiver 14, and a high-pressure metallic pipe 28 connects the receiver 14 and the thermostatic expansion valve 15.

The thermostatic expansion valve 15 is mainly composed of the expansion valve main portion 150 described above, a first joint 151 integrally including the check valve 16, and a second joint 152. The first joint 151 is connected to inlet and outlet pipes of the evaporator 17, and the second joint 152 is connected to an upstream side end of a low-pressure metallic pipe 29 and to the downstream side end of the high-pressure metallic pipe 28. The downstream side end of the low-pressure metallic pipe 29 is connected to the inlet of the accumulator 18, and the outlet of the accumulator 18 is connected to the suction side of the compressor 10 through a rubber hose 30.

An outlet portion of a metallic pipe 19a that defines the hot-gas bypass passage 19 therein is connected to a bypass joint port of the first joint 151. As shown in FIG. 2B, the metallic pipe 19a is covered with heat insulating material 19b on an outer circumference surface thereof, thereby preventing heat radiation from refrigerant inside the pipe 19a toward an ambient atmosphere. Preferably, the heat insulating material 19b is made of porous material such as ethylene propylene rubber (EPDE), and has a thickness of approximately 5 mm. The metallic pipe 19a is approximately 4/8 inches in an outer diameter, and approximately 10.1 mm in an inner diameter.

Concerning the pipe diameters of the respective portions in the refrigerating cycle system, for instance, an outer diameter of the compressor discharge side rubber hose 25 is 4/8 inches, an orifice diameter of the first electromagnetic valve 12 is 11 mm, an outer diameter of the condenser inlet side high-pressure metallic pipe 26 is 4/8 inches, outer diameters of the condenser outlet side high-pressure metallic pipe 27, and the receiver outlet side high-pressure metallic pipe 28 are 8 mm, respectively, an outer diameter of a pipe connecting the expansion valve 15 and the evaporator 17 is 4/8 inches, and an outer diameter of an evaporator outlet side rubber hose is 5/8 inches.

Figure 3:
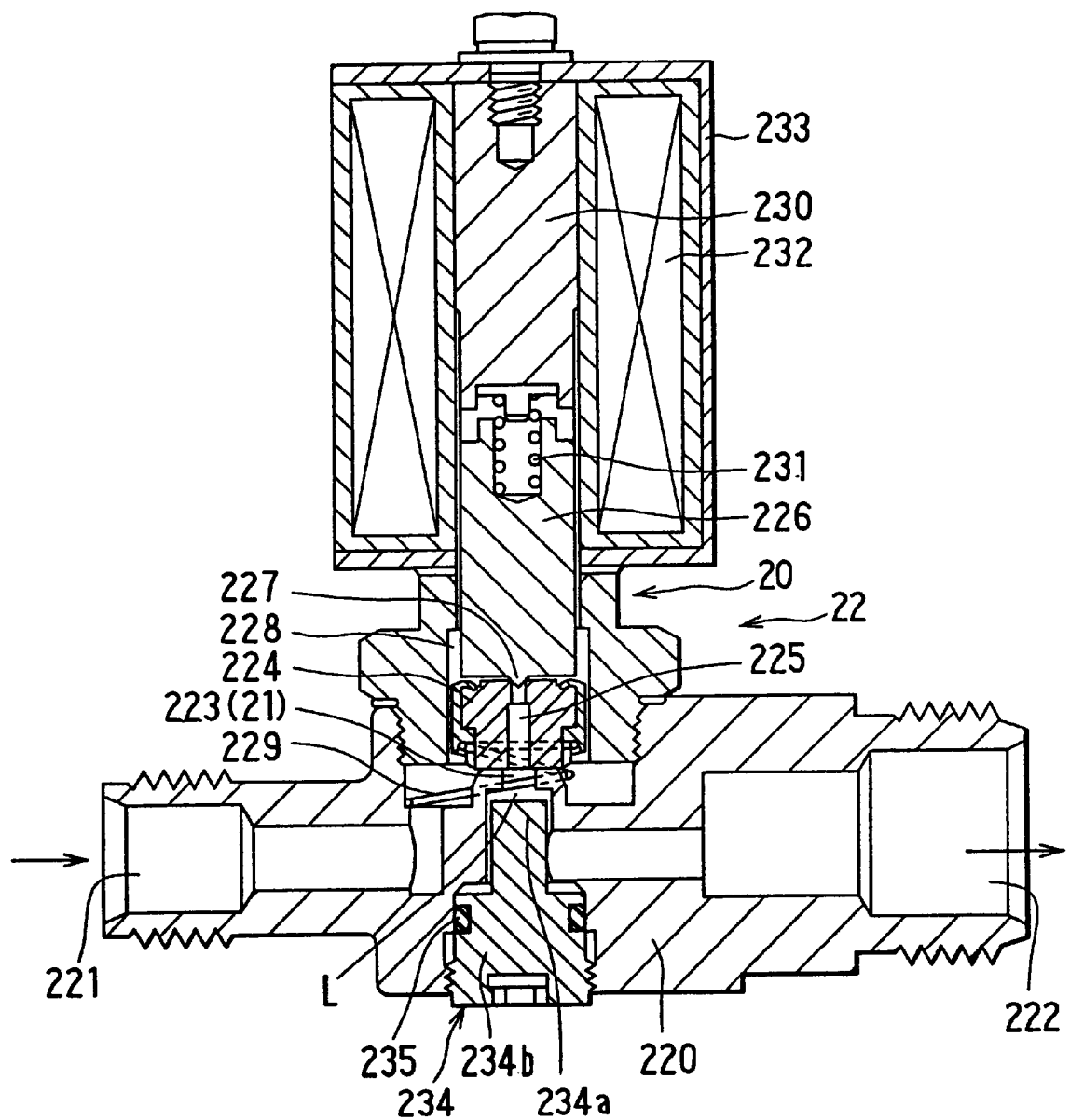
FIG. 3 is a cross-sectional view showing a valve unit in the first embodiment.

Next, the valve unit 22 shown in FIG. 1 will be specifically explained referring to FIG. 3. The valve unit 22 includes a valve housing 220 formed with an inlet joint portion 221 at an end thereof and an outlet joint portion 222 at the other end thereof. The inlet joint portion 221 is connected to the rubber hose 25 on the discharge side of the compressor 10, while the outlet joint portion 222 is connected to the inlet of the hot-gas bypass passage 19.

A restriction hole 223, i.e., the orifice of the second electromagnetic valve 20, is provided at an intermediate portion between the inlet and outlet joint portions 221, 222. In this embodiment, the restriction hole 223 constitutes the throttling part (second decompressing device) 21 described above. The restriction hole 223 is a circular hole with a diameter of approximately 2.2 mm. The electromagnetic valve 20 for opening/closing the restriction hole 223 is a pilot type valve having a main valve member 224. The main valve member 224 is composed of a columnar resin main body that is covered with a metallic material on an outer circumference surface thereof. A control hole 225 is open at the central portion of the main valve member 224. A pilot valve portion 227 provided an a front end of a plunger 226 opens/closes the control hole 225.

When the plunger 226 moves in an upper direction in FIG. 3 so that the pilot valve portion 227 opens the control hole 225, a back pressure chamber 228 of the main valve member 224 communicates with a passage on a side of the outlet joint portion 222 through the control hole 225 and the restriction hole 223, thereby decreasing pressure in the back pressure chamber 228. Accordingly, a differential pressure arises between the back pressure chamber 228 and the inlet portion, and the differential pressure and a force derived from a coil spring 229 are applied to the valve member 224 as a pushing force in the upper direction in FIG. 3. The pushing force displaces the valve member 224 in the upper direction. As a result, the restriction hole 223 is opened so that the electromagnetic valve 20 is opened. Then, refrigerant gas discharged from the compressor is decompressed into a specific pressure due to a throttling action of the restriction hole 223, and the decompressed refrigerant gas flows into the hot-gas bypass passage 19.

Next, an electromagnetic mechanism for moving the plunger 226 in the upper direction in FIG. 3 will be explained.

The plunger 226, which is a movable magnetic body, faces a fixed iron core member 230 with a coil spring 231 interposed therebetween. An electromagnetic coil 232 is disposed on the outer circumference side of the plunger 226 and the fixed iron core member 230. A yoke member 233 is disposed around the electromagnetic coil 232. Accordingly, when electricity is supplied to the electromagnetic oil 232, magnetic flux is produced in a magnetic circuit composed of the yoke member 233, the plunger 226, and the fixed iron core member 230, thereby producing an attraction force between the plunger 226 and the fixed iron core member 230. Consequently, the plunger 226 is displaced in the upper direction in FIG. 3 against the force of the spring 231.

In the valve housing 220, a gas flow noise suppression member 234 is disposed at the central portion between the inlet and outlet joint portions 221, 222 to face the restriction hole 223 on the downstream side immediately after the restriction hole 223. The gas flow noise suppression member 234 suppresses gas flow noise which is generated due to gas jet flow (jet core) when high pressure refrigerant gas discharged from the compressor 10 is suddenly decompressed by the restriction hole 223. Specifically, the gas flow noise suppression member 234 has a columnar part 234a having an outer diameter (for instance, φ4.0 mm) that is larger than the diameter (for instance, φ2.2 mm) of the restriction hole 223. A front end portion of the columnar part 234a is disposed to face the restriction hole 223 with a specific gap L. The specific gap L is approximately 0.5 times to 3.0 times as large as diameter d of the restriction hole 223, i.e., is in a range of approximately 0.5 d to 3.0 d. The gaseous refrigerant, which has been decompressed while passing through the restriction hole 223, hits against the front end of the columnar part 234a, and then passes through a clearance around the columnar part 234a to flow into the passage in the outlet joint portion 222. Incidentally, the gas flow noise suppression member 234 includes an attachment part 234b that has an outer diameter larger than that of the columnar part 234a and is integrally formed with the columnar part 234a from metal or resin. The member 234 is fixed to the valve housing 220 at the attachment part 234b through an O-ring 235.

Next, an operation in the first embodiment will be explained based on the constitution described above. At the cooling mode or at the humidifying state, the first electromagnetic valve 12 for cooling is opened and the second electromagnetic valve 20 for heating is closed by a control unit that is not shown. Further, the electromagnetic clutch 11 is brought to be a connected state, so that the compressor 10 starts to be driven by the automotive engine. Accordingly, gaseous refrigerant discharged from the compressor 10 flows into the condenser 13 through the opened state first electromagnetic valve 12. In the condenser 13, gaseous refrigerant is cooled by outside air blown from a cooling fan which is not shown, and accordingly the gaseous refrigerant is condensed. Then, the condensed refrigerant flows into the receiver 14 to be separated into liquid refrigerant and gaseous refrigerant. Only liquid refrigerant flows into the expansion valve 15 and is decompressed in the expansion valve main portion 150 to be a low temperature and low pressure gas-liquid two-phase state.

Successively, the low pressure refrigerant opens the check valve 16 accommodated in the first joint 151 of the expansion valve 15, and flows into the evaporator 17. In the evaporator 17, the refrigerant evaporates by absorbing heat from air, which is blown from the blower (not shown). Then, conditioned air cooled by the evaporator 17 is blown out into the compartment. On the other hand, gaseous refrigerant evaporated in the evaporator 17 is sucked into the compressor 10 after passing through the accumulator 18, and is compressed again.

At the winter season heating mode, the first electromagnetic valve 12 for cooling is closed, while the second electromagnetic valve 20 for heating is opened by the control unit not shown. When the second electromagnetic valve 20 is opened, the main valve member 224 is displaced in the upper direction in FIG. 3, so that the restriction hole 223 that makes up the throttling part 21 is opened, thereby opening the hot-gas bypass passage 19. Accordingly, after high pressure gaseous refrigerant (overheated gaseous refrigerant) discharged from the compressor 10 is decompressed by the restriction hole 223 of the second electromagnetic valve 20, the refrigerant flows into the evaporator 17 through the hot-as bypass passage 19. In the evaporator 17, the decompressed overheated gaseous refrigerant exchanges heat with air so that the air is heated.

When the hot-gas bypass passage 19 is opened, because pressure of gaseous refrigerant discharged from the bypass passage 19 keeps the closed state of the check valve 16, the discharged gaseous refrigerant does not flow upstream through the expansion valve 15. When hot water from the automotive engine flows in the hot-water type heat exchanger 24, the conditioned air can additionally be heated by the heat exchanger 24. The gaseous refrigerant, which has radiated heat in the evaporator 17, is sucked into the compressor 10 after passing through the accumulator 18, and is compressed again.

According to the first embodiment, as described above, the second electromagnetic valve 20 having the restriction hole 223 as a valve orifice is provided in the inlet portion of the hot-gas bypass passage 19, and the restriction hole 223 itself serves as the throttling part 21 for the hot-gas bypass passage 19. Therefore, gaseous refrigerant flows in the hot-gas bypass passage 19 after decompressed by the restriction hole 223 to have a lowered temperature.

For instance, at the winter season heating mode, gaseous refrigerant immediately after discharged from the compressor 10 can have a discharge pressure of 20 kgf/cm$^2$ and a temperature of 70° C., while a temperature of outside air can be −20° C., causing a large difference in temperature between refrigerant and outside air. In such a case, according to the first embodiment, the pressure and temperature of gaseous refrigerant can be decreased by the restriction hole 223 from 20 kgf/cm$^2$ to 2 kgf/cm$^2$, and from 70° C. to 40° C., respectively. Then, the refrigerant that has a decreased differences in temperature and pressure relative to outside air flows in the hot-gas bypass passage 19. Therefore, heat loss at the pipe portion of the hot-gas bypass passage 19 is reduced. In addition, because the heat insulating material 19b is disposed on the outer circumference surface of the pipe 19a, the heat loss at the pipe portion of the hot-gas bypass passage 19 is further reduced.

Further, the hot-gas bypass passage 19 can intentionally be installed at a position closed to the automotive engine so that the pipe portion of the hot-gas bypass passage 19 can receive heat from the automotive engine. This arrangement additionally and effectively decreases the heat loss at the pipe portion of the hot-gas bypass passage 19.

FIG. 4 shows Mollier charts of refrigerating cycles when the hot-gas bypass is opened. Broken line ① indicates a Mollier chart at an ideal state where heat loss at the pipe portion of the hot-gas bypass passage is zero, solid line ② indicates a Mollier chart of the first embodiment described above, and dashed line ③ indicates a Mollier chart of a comparative example in which the throttling part 21 is provided at an intermediate portion in the hot-gas bypass passage 19.

Comparing the first embodiment ② and the comparative example ③, it is confirmed that heating capacity $Q_1$ of the first embodiment ② is larger than heating capacity $Q_2$ of the comparative example ③. This implies that the heat loss at the pipe portion of the hot-gas bypass passage 19 in the first embodiment is smaller than that in the comparative example. FIG. 5 shows power conversion efficiencies, each representing a ratio between radiation amounts in the evaporator 17 and in the compressor power, of the first embodiment ② and the comparative example ③. Accordingly, it is confirmed that the power conversion efficiency of the first embodiment ② is improved from 0.5 up to 0.7 as compared to that of the comparative example ③.

Figure 6A:
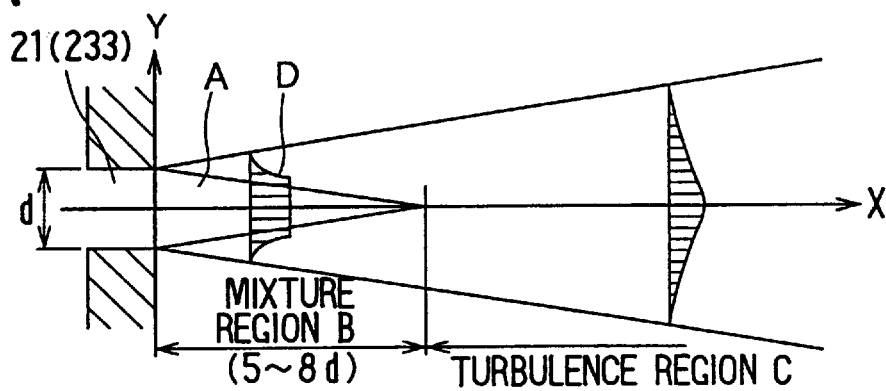
FIG. 6A is a diagram for explaining a cause for generating noise at a throttling part of the hot-gas bypass passage in the first embodiment.

The first embodiment further adopts a countermeasure against the noise at the throttling part 21 of the hot-gas bypass passage 19. Next, the countermeasure against the noise will be specifically explained. First, a mechanism of producing the noise at the throttling part 21 of the hot-gas bypass passage 19 will be explained referring to FIGS. 6A and 6B. In the throttling part 21 (restriction hole 223), a pressure of gaseous refrigerant is suddenly decreased from a high pressure of, for instance, 20 kgf/cm$^2$, into a low pressure of, for instance, 2 kgf/cm$^2$. Therefore, a sound velocity state gas jet flow (jet core) A is produced at the outlet side of the throttling part 21.

Figure 6B:
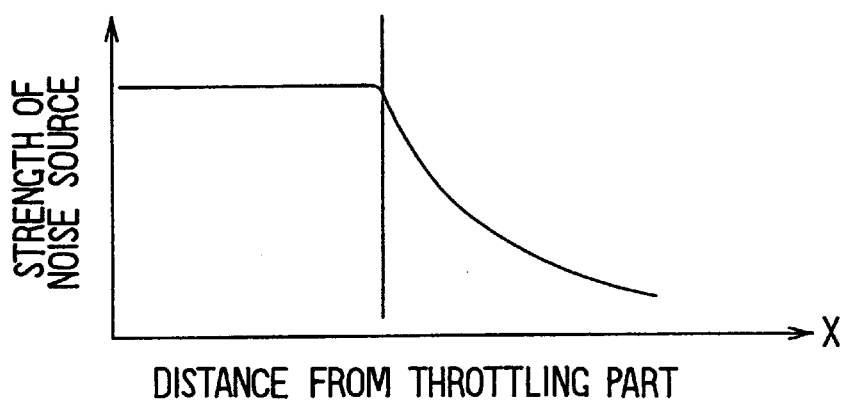
FIG. 6B is a graph shownig a noise strength property with respect to a distance from the throttling part.

The gas jet flow A is produced in a region, a length of which is 5 to 8 times as large as diameter d of the throttling part 21. A mixture region B having a sudden velocity gradient D is produced around the gas jet flow A. A turbulence region C is further produced at the downstream side of the mixture region B. The gas flow noise is generated due to the sudden velocity gradient D of the mixture region B. As shown in FIG. 6B, the gas flow noise is especially large in a region corresponding to the mixture region B.

Figure 7:
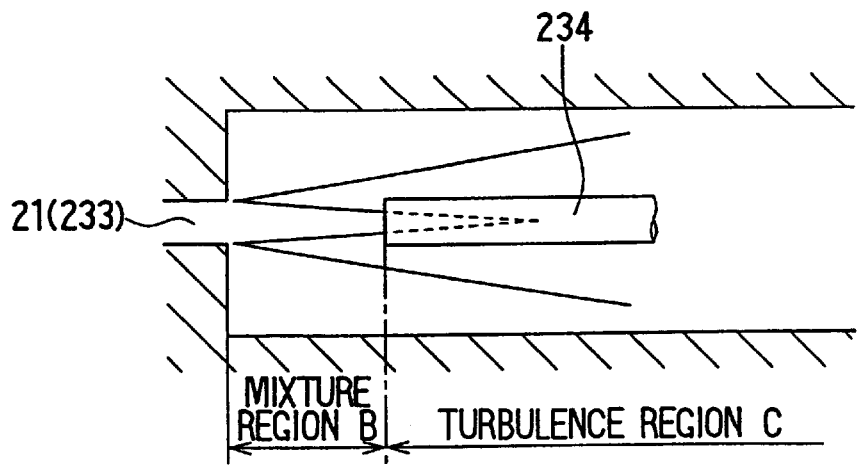
FIG. 7 is an explanatory view showing a gas flow noise suppression member in the first embodiment.

Therefore, in the first embodiment, as shown in FIG. 7, the gas flow noise suppression member 234 is disposed in the region, where the gas jet flow A is produced, to be opposed to the throttling part 21. Accordingly, the gas jet flow A hits against the front end face of the suppression member 234, so that the mixture region B formed by the gas jet flow A is decreased. The decrease of the mixture region B reduces the gas flow noise.

FIG. 8 specifically shows the noise reducing effect by the gas flow noise suppression member 234. As operational conditions of the refrigerating cycle, a temperature of air that is sucked into the evaporator 17 is −20° C., a flow amount of air that is sucked into the evaporator 17 is 150 m$^3$/h, a rotational speed of the compressor 10 is 760 rpm, an upstream side pressure of the throttling part 21 is 1.3 MPa, a downstream side pressure of the throttling part 21 is 0.4 MPa, and an inner diameter of the throttling part 21 is 2.4 mm.

Figures 8A, 8B, 8C:
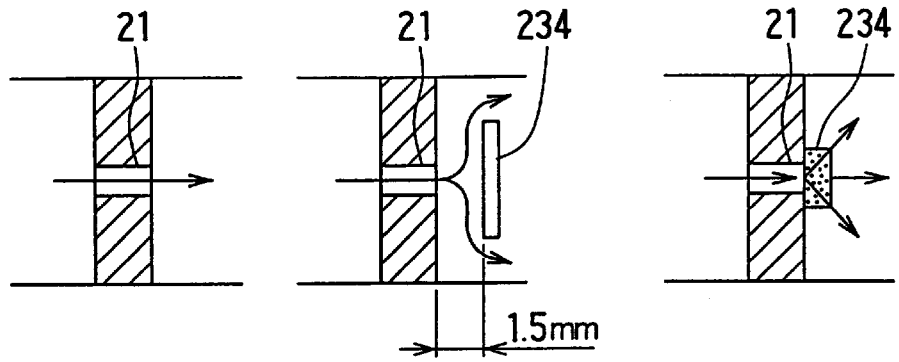
FIGS. 8A to 8c are explanatory views showing experimental results concerning gas flow noise suppression members in the first embodiment.

FIG. 8A shows a comparative example only adopting the throttling part 21 and not adopting the gas flow noise suppression member 234, FIG. 8B shows the first embodiment in which the gas flow noise suppression member 234 is disposed at a position apart from the outlet face of the throttling part 21 by 1.5 mm. It is confirmed that, in the first embodiment shown in FIG. 8B, the noise at the throttling part 21 is decreased from 68 dB to 54.5 dB, and the noise at the evaporator 17, which is installed within the compartment, is decreased from 49.5 dB to 46 dB, as compared to the comparative example shown in FIG. 8A.

FIG. 8C shows an example modified from the first embodiment. In the example, a gas flow noise suppression member 234a is composed of a porous metallic member made of nickel-chromium (Ni—Cr) alloy and having a porosity rate of 96% so that refrigerant can pass through, and the gas flow noise suppression member 234a is closely attached to the outlet face of the throttling part 21. When the gas flow noise suppression member 234a shown in FIG. 8C is used, it is founded that the noise at the throttling part 21 is decreased to 43 dB. Further, it is confirmed that the noise reducing effect can be obtained as well even when the gas flow noise suppression member 234a of FIG. 8C is disposed apart from the outlet face of the throttling part 21 by a specific distance (for instance, approximately 1.5 mm).

(Second Embodiment)

Figure 9:
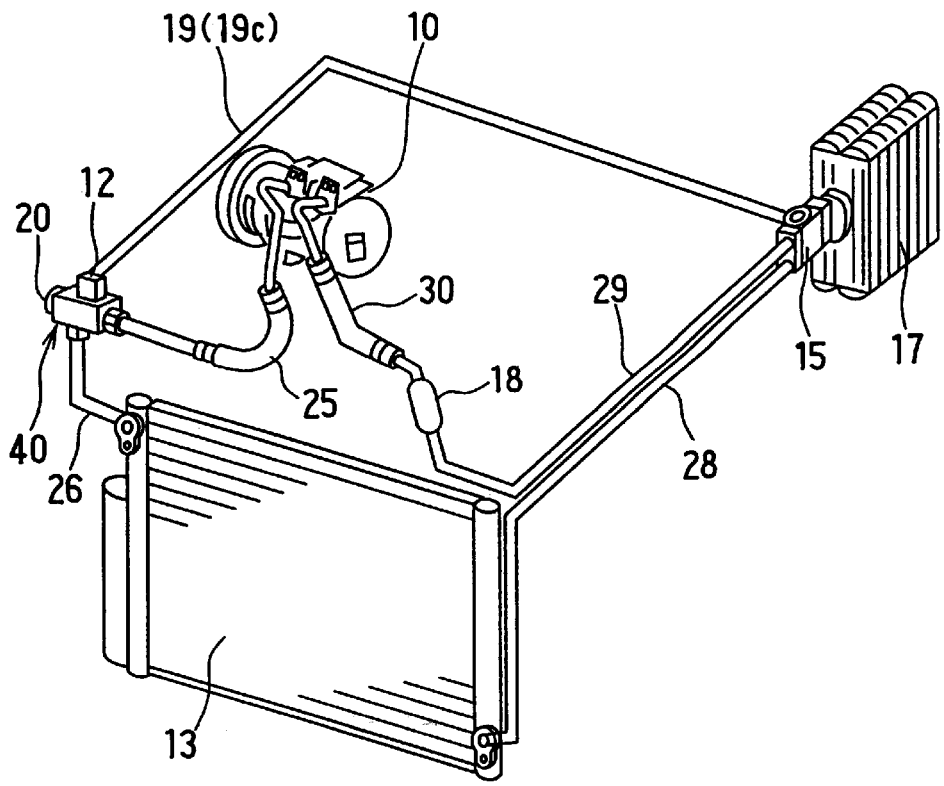
FIG. 9 is a shematic perspective view showing a refrigerating cycle system mounted on a vehicle in a second preferred embodiment.

A refrigerating cycle system in a second preferred embodiment is shown in FIGS. 9 and 10. Points different from the first embodiment are that the first and second electromagnetic valves 12, 20 are unified as a valve unit 40, and that a function of the throttling part 21 of the hot-gas bypass passage 19 is provided at two steps using the restriction hole (first step throttling part) 223 as the valve orifice of the second electromagnetic valve 20, and a fine tube (second step throttling part) 19c that is disposed at the downstream side of the restriction hole 223. The fine pipe 19c is a metallic pipe (capillary tube) for defining the hot-gas bypass passage 19 therein.

As shown in FIG. 10, the valve unit 40 has a valve housing 41 that integrally forms therein both passage portions of the first electromagnetic valve 12 for cooling and the second electromagnetic valve 20 for heating. The valve housing 41 integrally includes a portion corresponding to the valve housing 220 shown in FIG. 3. In the second electromagnetic valve 20 shown in FIG. 10, the same parts as those in FIG. 3 are indicated by the same reference numerals, and those detail explanations will not be reiterated.

The inlet joint portion 221, which is to be connected to the rubber hose 25 on the discharge side of the compressor 10, always communicates with an inlet chamber 43 of the second electromagnetic valve 20 through a communication passage 42 in the valve housing 41. An outlet passage 44 of the second electromagnetic valve 20 for heating is perpendicularly connected to the passage of the outlet joint portion 222. The outlet passage 44 has the restriction hole (valve orifice) 223 which is opened/closed by the main valve member 224.

The first electromagnetic valve 12 for cooling is also a pilot type valve similarly to the second electromagnetic valve 20 for heating. In the first electromagnetic valve 12, a valve orifice 121 communicating with an outlet joint portion 120 that is connected to the condenser 13 is provided within the valve housing 41, and is opened/closed by a main valve member 122. The main valve member 122 has a control hole 123 at the central portion thereof, and the control hole 123 is opened/closed by a pilot valve portion 125 provided at a front end of a plunger 124.

When the plunger 124 is moved in an upper direction in FIG. 10 so that the pilot valve portion 125 opens the control hole 123, a back pressure chamber 126 of the main valve member 122 communicates with the passage on a side of the outlet joint portion 120 through the control hole 123, thereby decreasing the pressure in the back pressure chamber 126. Accordingly, a differential pressure between the side of the inlet joint portion 221 and the back pressure chamber 126 arises to produce a pushing force applied to the diaphragm 127 in the upper direction in FIG. 10. The valve member 122 is displaced in the upper direction by the pushing force, so that the valve orifice 121 is opened, thereby opening the first electromagnetic valve 12.

The electromagnetic mechanism for moving the plunger 124 in the upper direction in FIG. 10 is substantially the same as that of the second electromagnetic valve 20. Specifically, the plunger 124 is composed of a movable magnetic body, and a fixed iron core member 128 is disposed to face the plunger 124. A coil spring 129 is disposed between both members 128, 124. Further, an electromagnetic coil 130 and a yoke member 131 are disposed around the plunger 124. Accordingly, when electricity is supplied to the electromagnetic coil 130, magnetic flux is produced in a magnetic circuit composed of the yoke member 131, the plunger 124, and the fixed iron core member 128 to produce an attraction force between the plunger 124 and the fixed iron core member 128. As a result, the plunger 124 is displaced in the upper direction in FIG. 10 against a force derived from the spring 129.

On the other hand, when the supply of electricity to the electromagnetic coil 130 is stopped, the electromagnetic attraction force described above disappears. Accordingly, the plunger 124 is displaced in the lower direction in FIG. 10 by the force of spring 129, and the pilot valve portion 125 closes the control hole 123. In this case, because the back pressure chamber 126 always communicates with the passage in the inlet joint portion 221 through a minute communication hole 132, the pressure in the back pressure chamber 126 becomes equal to that on the side of the inlet joint portion 221, thereby eliminating the differential pressure described above. Accordingly, the main valve member 122 is displaced in the lower direction in FIG. 10 by the force of the spring 129 so that the valve orifice 121 is closed. That is, accordingly, the first electromagnetic valve 12 is closed.

The metallic fine pipe (capillary tube) 19c that defines therein the hot-gas bypass passage 19 shown in FIG. 9 is connected to the outlet joint portion 222 of the second electromagnetic valve 20 for heating. Therefore, in the second embodiment, the throttling part 21 is composed of two-step parts of the restriction hole 223 serving as the valve orifice of the second electromagnetic valve 20 and the fine pipe 19c disposed on the downstream side of the restriction hole 223. The fine pipe 19c is preferably covered with the heat insulating material 19b similarly to the pipe 19a shown in FIG. 2B.

Next, the two-step constitution of the throttling part 21 will be explained in more detail. Preferably, the diameter of the restriction hole 223 is 3 mm, the outer diameter of the fine pipe 19c is 6 mm, the inner diameter of the fine pipe 19c is 4 mm, and the length of the fine pipe 19c is 1500 mm. The diameters of the outlet passage 44 and the outlet joint portion 222 are 3 mm, respectively, which is equal to the diameter of the restriction hole 223. The diameters of the other pipes in the refrigerating cycle are substantially the same as those in the first embodiment. When the dimensions of the restriction hole 223 and the fine pipe 19c are set as described above, a first step restriction percentage at the restriction hole 223 is set at approximately 50% and a second step restriction percentage at the fine pipe 19c is set at approximately 50%.

According to the second embodiment, gaseous refrigerant (hot gas) is first decompressed by the restriction hole 223 at the inlet portion of the hot-gas bypass passage 19, and then flows within the fine pipe 19c of the hot-gas bypass passage 19. The first step restriction amount by the restriction hole 223 is decreased as compared to that in the first embodiment so that a temperature of decompressed refrigerant is increased. However, the temperature of refrigerant is still lowered to an intermediate temperature between 70° C. and 40° C. in the case of the first embodiment, so that a difference between the temperature of refrigerant in the fine pipe 19c and the ambient temperature is decreased.

In addition, in the first embodiment, because the throttling part 21 is composed of one step, the diameter of the pipe 19a on the downstream side of the throttling part 21 must be more than a specific dimension in order to correspond to an increase in a specific volume of refrigerant by decompression. To the contrary, in the second embodiment, the throttling part 21 includes the second step throttling part composed of the fine pipe 19c that is disposed on the downstream side of the restriction hole 223 serving as the first step throttling part. The fine pipe 19c has a surface area smaller than that of the fine pipe 19a. Further, the flow rate of refrigerant in the fine pipe 19c is increased. Consequently, heat loss of refrigerant flowing in the fine pipe 19c can be effectively lessened as compared to that in the first embodiment.

Further, because the second step throttling part is composed of the fine pipe 19c, the pipe space for installation is reduced, so that the pipe can be readily arranged in a narrow space of a vehicle and the like. In the second embodiment, when the outlet portion of the fine pipe 19c is positioned within or adjacently to the compartment, there may arise a noise problem by gas jet flow (jet core) at the outlet portion. Therefore, in such a case, it is preferable that the gas flow noise suppression member 234 in the first embodiment be installed in the outlet portion of the fine pipe 19c as in the first embodiment.

(Third Embodiment)

In the first embodiment, the gas flow noise suppression member 234 is disposed within the formation region of the gas jet flow A to face the throttling part 21, so that the gas jet flow A hits against the front end face of the suppression member 234. As a result, the mixture region B formed by the gas jet flow A is decreased, thereby reducing the gas flow noise. As opposed to this, in a third preferred embodiment, the refrigerant flow noise is suppressed without using the gas flow noise suppression member 234.

Specifically, when the hot-gas bypass passage 19 is opened, refrigerant pressure is suddenly reduced at passage suddenly enlarged portions of the throttling part outlet portion and the hot-gas bypass passage outlet portion. Accordingly, the velocity of gaseous refrigerant is increased up to sound velocity, thereby causing an increase in the refrigerant flow noise. In consideration of this phenomenon, in the third embodiment, the throttling part outlet portion and the hot-gas bypass passage outlet portion are tapered so that cross-sectional areas thereof are gradually increased. Accordingly, sudden decrease in the refrigerant pressure is suppressed, and the velocity of gaseous refrigerant is suppressed at a magnitude that is smaller than the sound velocity, thereby reducing the refrigerant flow noise at the respective parts.

First, a relationship between specific combinations in diameters of the throttling part 21 for heating and the hot-gas bypass passage 19, and noise levels at the evaporator part will be explained referring to FIGS. 11A to 11C. A table of FIG. 11A indicates four kinds of combinations ①–④ between the diameter of the throttling part 21 and the inside diameter of the hot-gas bypass passage 19. Combination ④ is a case where the hot-gas bypass passage 19 is tapered so that the inside diameter thereof is gradually increased from φ2.4 mm to φ10.1 mm from the throttling part 21 within length L (1 m) of the hot-gas bypass passage 19. Incidentally, the pipe on the inlet side of the evaporator 17 has outer diameter D of ½ inches.

In the four kinds of hot-gas bypass passage constitutions, changes in refrigerant pressure that occurred when the hot-gas bypass passage 19 was operated were measured. The results are shown in FIG. 11B. As operational conditions, an outside air temperature is −10° C., a rotational speed of the compressor 10 is 1500 rpm, and a speed (flow amount) of an air conditioning blower for blowing air (outside air) is $L_0$.

As shown in FIG. 11B, it is found that the refrigerant pressure largely varies at throttling part portion E that is provided at the inlet portion of the hot-gas bypass passage 19, and at outlet confluence portion F that is provided at the outlet portion of the hot-gas bypass passage 19. Further, refrigerant noise levels at the evaporator parts in combinations ①–④ were measured when the hot-gas bypass passage 19 was operated. The results are shown in FIG. 11C. Because the outlet confluence portion F of the hot-gas bypass passage 19 is positioned adjacently to the evaporator 17, the noise is the largest in combination ③ in which the change in refrigerant pressure at the outlet confluence portion F is the largest, and further, the noise in combination ① in which the change in refrigerant pressure at the throttling part portion E is the largest is larger than those in the other combinations ②, ③.

As opposed to this, in combination ②, the diameter of the throttling part 21 is enlarged to φ2.4 mm, and the inner diameter of the hot-gas bypass passage 19 is decreased from φ10.1 mm to φ6 mm. Accordingly, the change in pressure immediately after the throttling part 21 is mitigated so that the noise at the evaporator part is reduced. Further, in combination ④, tapered passage portions whose cross-sectional areas gradually increase are provided at both inlet throttling part portion and the outlet confluence portion of the hot-gas bypass passage 19. Accordingly, in combination ④, the change in pressure is suppressed at both portions immediately after the throttling part 21 and the outlet confluence portion of the hot-gas bypass passage 19, and the noise at the evaporator part is consequently the most largely reduced. The third embodiment has been made based on the experimental results shown in FIGS. 11A to 11C.

Next, a specific structure of a thermal expansion valve 15 in the third embodiment will be explained referring to FIG. 12. The same parts and components as those in the first embodiment are indicated by the same reference numerals. The expansion valve 15 is, as described above, mainly composed of an expansion valve main portion 150, and first and second joints 151, 152. The expansion valve main portion 150 is a so-called box-type, and includes a gaseous refrigerant passage 153 in which gaseous refrigerant that is evaporated in the evaporator 17 flows. A diaphragm 154 is displaced based on pressure and temperature of refrigerant within the passage 153, and a spherical valve member 157 is displaced by the displacement of the diaphragm 154 via a temperature-sensitive rod 155 and an operational rod 156. The valve member 157 adjusts a refrigerant flow amount by controlling an opening degree of a restriction passage 160 that is provided between a high-pressure passage 158 and a low-pressure passage 159. These parts 153–160 are provided in a longitudinal rectangular parallelepiped housing 161.

The first joint 151 is composed of a main block member 162 that is connected to the housing 161 of the valve main portion 150 and a sub-block member 163 that is connected to the main block member 162. A low-pressure passage 164 is provided in the main block member 162 to communicate with the low-pressure passage 159, and the check valve 16 is disposed in the low-pressure passage 164.

The check valve 16 is formed from resin into a generally columnar shape, and an O-ring (elastic sealing member) 16a is disposed on the outer circumference surface of the check valve 16. When a pressure is applied to the check valve 16 from a check valve outlet side (right side in FIG. 12) in a reverse direction, the O-ring 16a is pushed against a seat face of the low-pressure passage 164, thereby bringing the check valve 16 into a closed state. On the other hand, when a pressure is applied to the check valve 16, from a check valve inlet side (left side in FIG. 12) in a forward direction, the O-ring 16a is detached from the seat face of the low-pressure passage 164, and accordingly the check valve 16 is brought into an opened state. FIG. 12 shows the state where the check valve 16 is closed. The check valve 16 is integrally formed with an engagement claw part 16b for restricting an opening degree of the check valve 16 within a specific value.

Further, the low-pressure passage 164 in the main block member 162 has a bypass joint passage 165 at the check valve outlet side. The bypass joint passage 165 extends in a direction perpendicular to a paper space of FIG. 12, and is connected to a bypass joint 171 shown in FIG. 13. The bypass joint 171 is fixed to the main block member 162 by a bolt 172. The bypass joint passage 165 passes through the wall of the bypass joint 171 in a thickness direction (in left-right direction in FIG. 13), and the pipe 19a of the hot-gas bypass passage 19 is joined to an end portion (on a right side in FIG. 13) of the bypass joint passage 165 by brazing or the like.

The bypass joint passage 165 is tapered from the outlet portion of the pipe 19a of the hot-gas bypass passage 19 toward the lower-pressure passage 164 with specific tapered angle $\Theta_r$, so that cross-sectional area thereof is gradually increased. Another end of the bypass joint passage 156 having the most enlarged diameter communicates with the low-pressure passage 164.

On the other hand, the main block member 162 further includes therein a gaseous refrigerant passage 166 that extends in parallel with the low-pressure passage 164 so as to be connected to the gaseous refrigerant passage 153 of the expansion valve main portion 150. The sub-block member 163 has two joint ports 167, 168. Both of gas-liquid two-phase refrigerant, which is decompressed by the restriction passage 160 of the valve main portion 150, and hot gas, which flows out from the hot-gas bypass passage 19, enters the joint port 167, while the other joint port 168 is connected to the outlet pipe of the evaporator 17.

The second joint 152 is connected to the housing 161 of the valve main portion 150 on a side opposite the main block member 161 of the first joint 151, and has two joint ports 169, 170 as well. The joint port 169 is connected to the outlet side of the receiver 14, while the other joint port 170 is connected to the inlet side of the accumulator 18. Accordingly, gaseous refrigerant that is evaporated in the evaporator 17 flows in a rout of the joint port 168 → the gaseous refrigerant passage 166 → the gaseous refrigerant passage 153 → the joint port 170, and then flows toward the accumulator 18.

Figure 13:
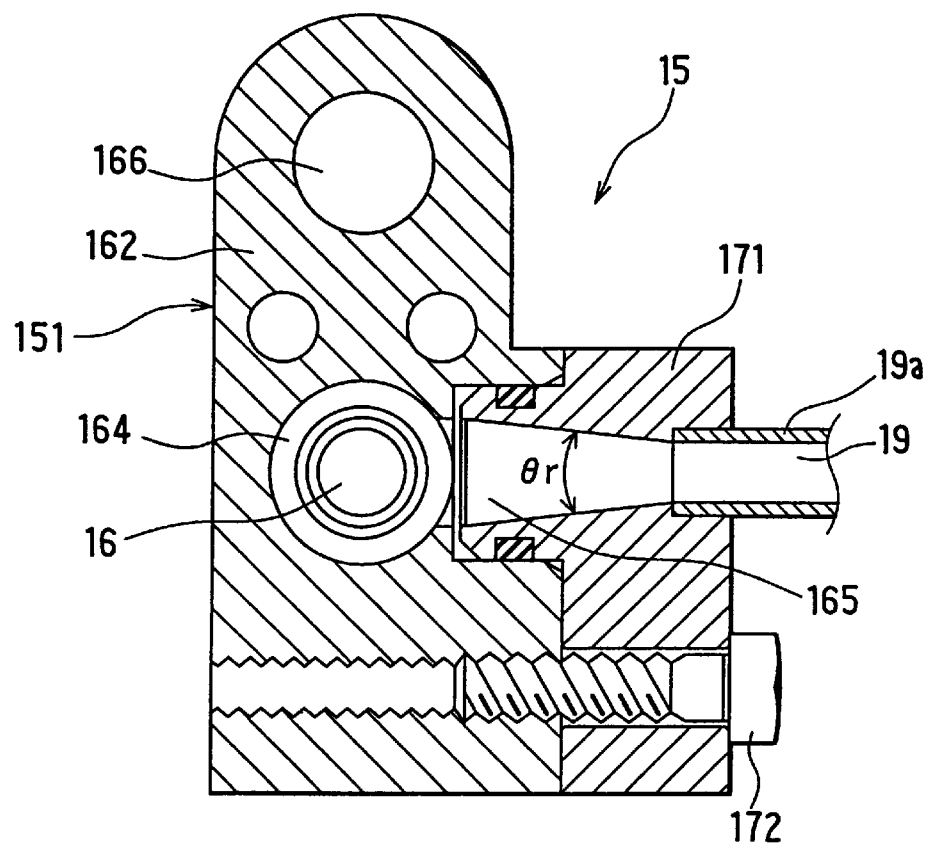
FIG. 13 is a cross-sectional view taken along a XIII—XIII line in FIG. 12.

In FIG. 13, the bypass joint passage 165 is tapered to prevent a sudden enlargement of the hot-gas bypass passage 19 at the outlet confluence portion. In addition to that, in the third embodiment, as schematically shown in FIG. 14, a tapered passage portion 50 is provided at a portion immediately after the throttling part 21 in the inlet portion of the hot-gas bypass passage 19 so that a cross-sectional area thereof is gradually increased with specific tapered angle $\Theta_f$.

Figure 15:
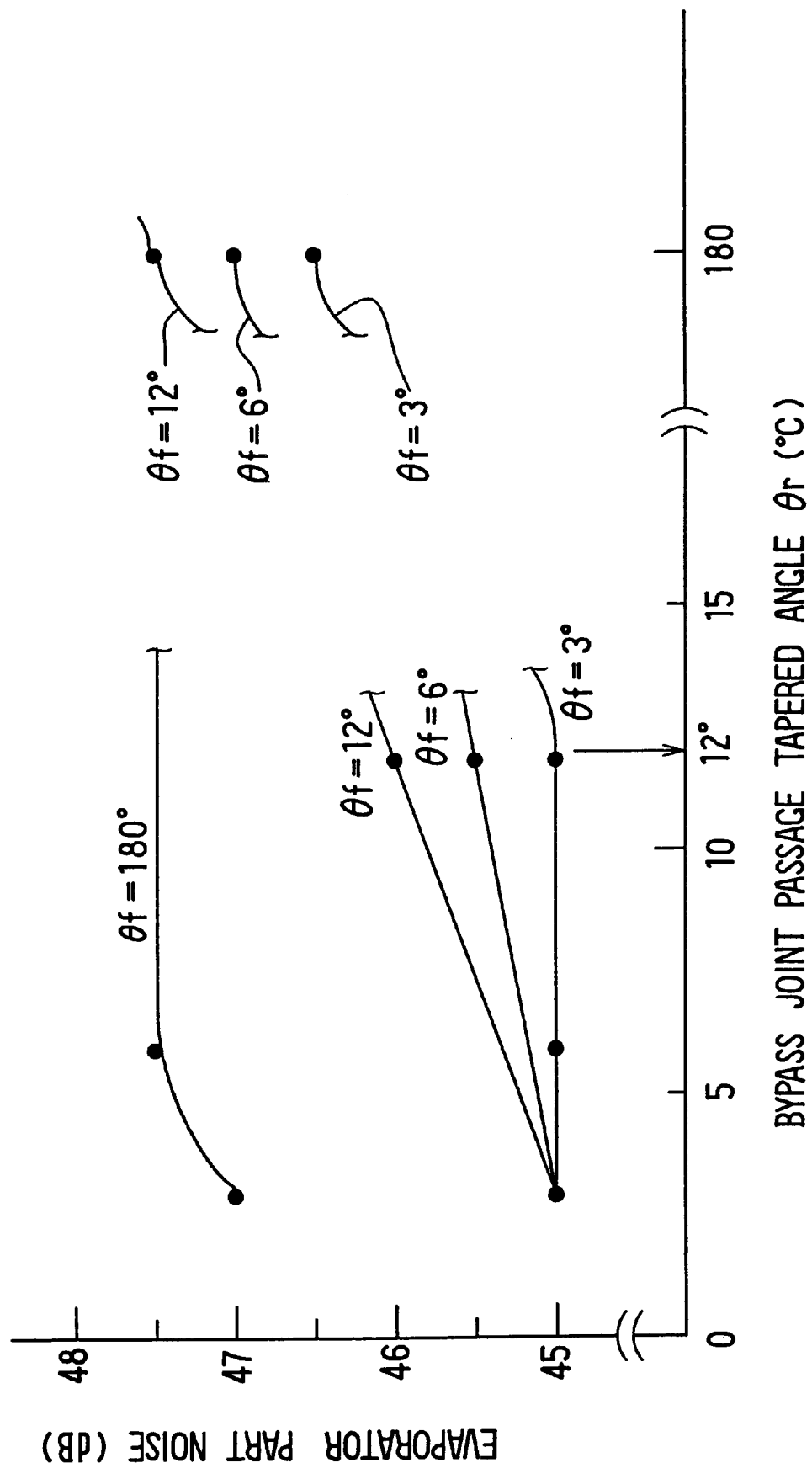
FIG. 15 is a graph showing a noise reducing effect at an evaporator part in the third embodiment.

FIG. 15 shows experimentally obtained relationships between evaporator part noise levels, and tapered angles $\Theta_f$ and $\Theta_r$ of the tapered passage portion 50 and the bypass joint passage 165. A horizontal axis in FIG. 15 indicates tapered angles $\Theta_r$ of the bypass joint passage 165. Accordingly, it is confirmed that the evaporation part noise is reduced within 46 dB, when the tapered angle $\Theta_r$ of the bypass joint passage 165 on the outlet side is set less than 12° ($\Theta_r<12°$) and the tapered angle $\Theta_f$ of the tapered passage portion 50 is set less than 12° ($\Theta_f<12°$) Especially, when the tapered angle $\Theta_f$ of the tapered passage portion 50 is 3°, the evaporation part noise can be suppressed at a generally constant low level of 45 dB even when the tapered angle $\Theta_r$ of the outlet side bypass joint passage 165 is increased up to 12°.

As described above, according to the third embodiment, the evaporator part noise can be decreased into the level approximately equal to those shown in FIGS. 8B and 8C, without using the gas flow noise suppression member 234. Incidentally, in FIG. 15, when the tapered angle $\Theta_f$ or $\Theta_r$ is 180°, the corresponding one of the passages 20 and 165 is not tapered and has a cross-sectional area that suddenly and perpendicularly increases. In this case, because the suddenly enlarged passage portion exists at at least one of the inlet side portion after the throttling part 21 and the outlet side portion of the hot-gas bypass passage 19, the evaporator part noise is increased.

Figure 14:
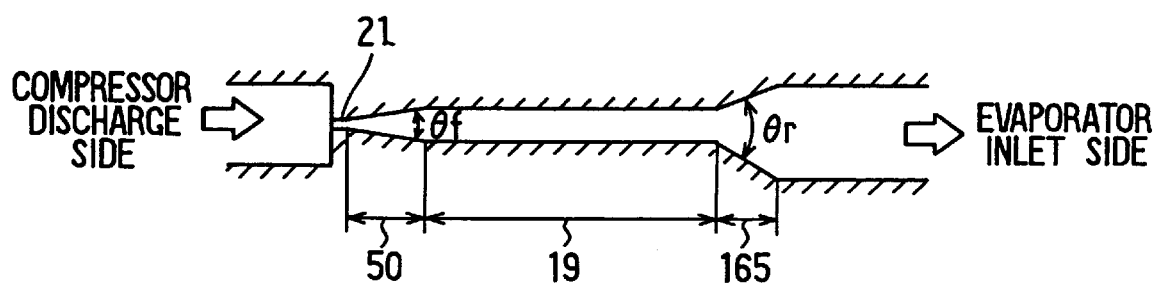
FIG. 14 is an explanatory view schematically showing a constitution of the hot-gas bypass passage in the third embodiment.

In FIG. 14, although the tapered passage portion 50 is schematically shown immediately after the throttling part 21, the tapered passage portion 50 may be provided at the passage portion in the outlet joint portion 222 of the electromagnetic valve 20 for heating shown in FIG. 3. Similarly, the tapered passage portion 50 may be provided at the passage portion in the outlet joint portion 222 or at the outlet passage 44 of the electromagnetic valve 20 for heating in the valve housing 41 of the valve unit 40. Further, a joint (not shown) having the tapered passage portion 50 therein may be interposed between the outlet joint portion 222 of the valve housing 220 (or the valve housing 41) and the inlet portion of the pipe 19a of the hot-gas bypass passage 19. Also, the gas flow noise suppression member 234 that is disposed immediately after the throttling part 21 at the inlet portion of the bypass passage 19 as in the first embodiment may be combined with the tapered bypass joint passage 165 that is provided at the outlet side of the bypass passage 19 as in the third embodiment.

Figure 12:
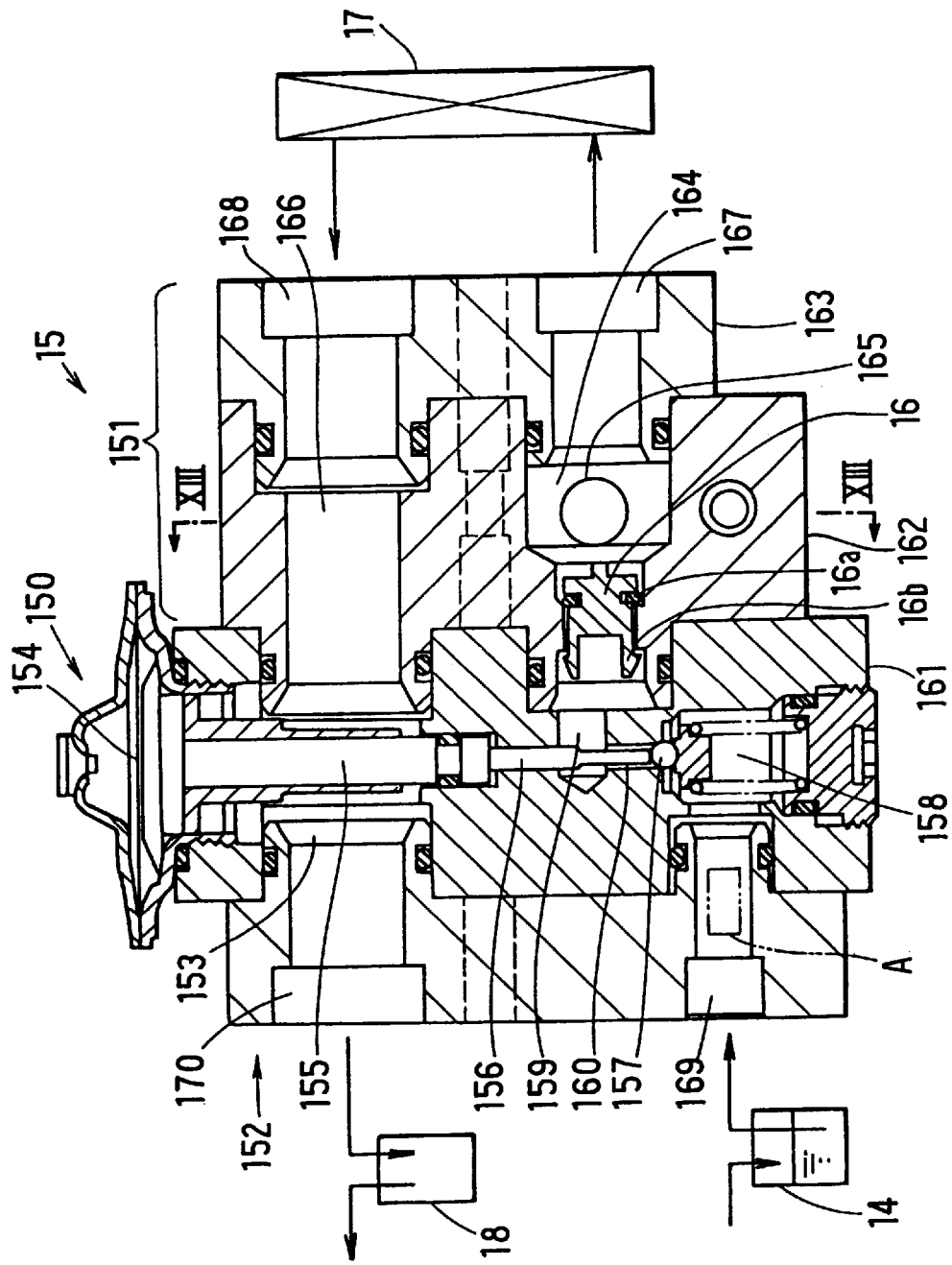
FIG. 12 is a cross-sectional view showing a thermostatic expansion valve in the third embodiment.

Also, in the first to third embodiments described above, because the check valve 16 is accommodated in the first joint 15 of the expansion valve 15 as shown in FIG. 12, the check valve 16 is positioned at the downstream side immediately after the restriction passage 160 of the expansion valve 15. Accordingly, the check valve 16 can be disposed at a very short distance (for instance, approximately 5 mm) from the bypass joint passage 165 that is connected to the outlet portion of the hot-gas bypass passage 19, thereby securely preventing a state where gaseous refrigerant from the hot-gas bypass passage 19 reversely flows into the high-pressure side pipe 28 (see FIG. 2A) that is cooled by outside air. As a result, gaseous refrigerant from the hot-gas bypass passage 19 is prevented from being transformed into a liquid state to gather in the pipe 28.

(Fourth Embodiment)

Figure 16:
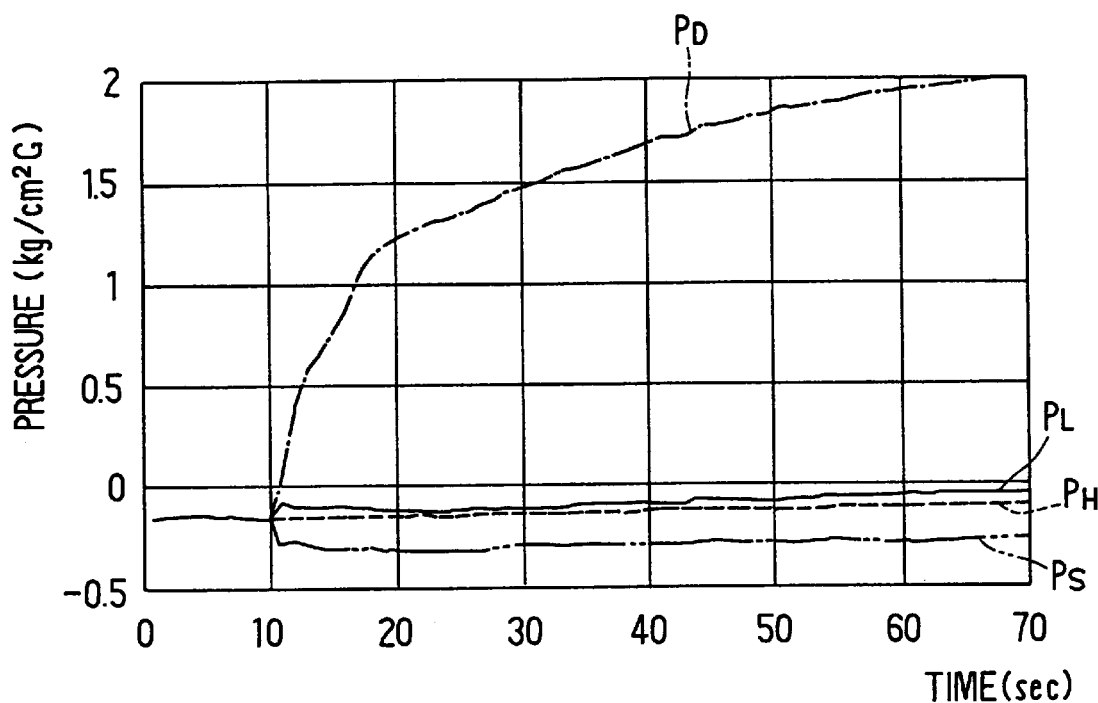
FIG. 16 is a graph showing pressure changes in a refrigerating cycle when a hot-gas bypass passage is operated.
Figure 17:
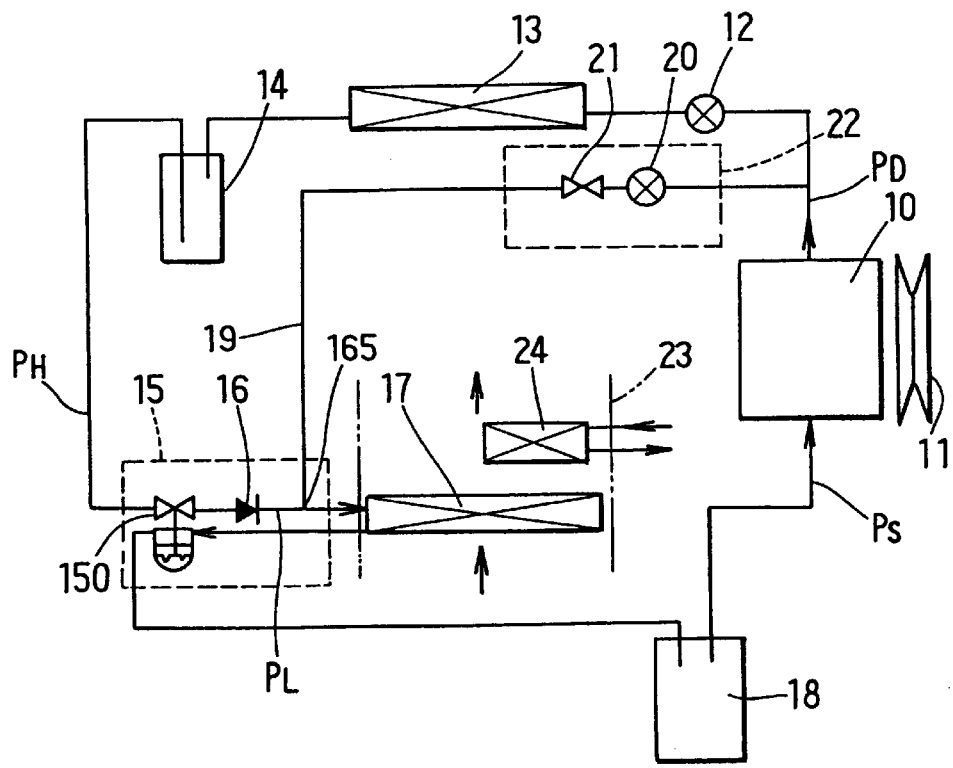
FIG. 17 is a diagram showing a refrigerating cycle system for explaining pressures in FIG. 16.

In a fourth preferred embodiment, a valve effect of the closed check valve 16 is further improved. FIG. 16 shows cycle pressure changes when the hot-gas bypass passage 19 is operated. As experimental conditions for FIG. 16, an outside air temperature is −30° C., a rotational speed of the compressor 10 is 1000 rpm, and an air flow amount blown into the air conditioning unit 23 is Hi (300 m³/h). Referring to FIG. 17, $P_D$ is a discharge pressure of the compressor 10, $P_H$ is a pressure at an upstream side of the thermostatic expansion valve 15, $P_L$ is a pressure at a downstream side of the check valve 16, and $P_S$ is a suction pressure of the compressor 10.

As shown in FIG. 16, it is found that when the operation of the hot-gas bypass passage 19 is started at an extremely low temperature and at a small rotational speed (1000 rpm) of the compressor 10, a differential pressure ($P_L-P_H$) that is applied to the check valve 16 in a direction for closing the check valve 16 is extremely small. In this case, the differential pressure ($P_L-P_H$) cannot securely close the check valve 16, resulting in insufficient sealing strength of the closed check valve 16. The insufficient sealing strength of the check valve 16 causes a phenomenon such that gaseous refrigerant from the hot-gas bypass passage 19 reversely flows toward the condenser 13 by sealing leakage through the check valve 16. In this case, even when the refrigerating cycle is stopped, gaseous refrigerant may gradually flows from the hot-gas bypass passage side and from the evaporator side toward the condenser 13 through the closed check valve 16. These phenomena can cause shortage of refrigerant when the hot-gas bypass passage 19 is operated, resulting in deterioration of heating capacity, and circulation shortage of the compressor 10.

Specifically, when the check valve 16 is installed so that the axis of the check valve 16 becomes parallel to a horizontal direction as shown in FIG. 12, the check valve 16 is opened/closed by moving in the horizontal direction. In this case, the self-weight of the check valve 16 is not utilized to open/close the check valve 16. Further, in a case where the check valve 16 (expansion valve 15) is installed so that the axis of the check valve 16 is inclined with an evaporator side thereof (right side in FIG. 12) facing obliquely downward, the self-weight of the check valve 16 is applied in a direction for opening the check valve 16. Therefore, in this case, refrigerant becomes liable to more readily leak from the closed check valve 16.

Figure 18:
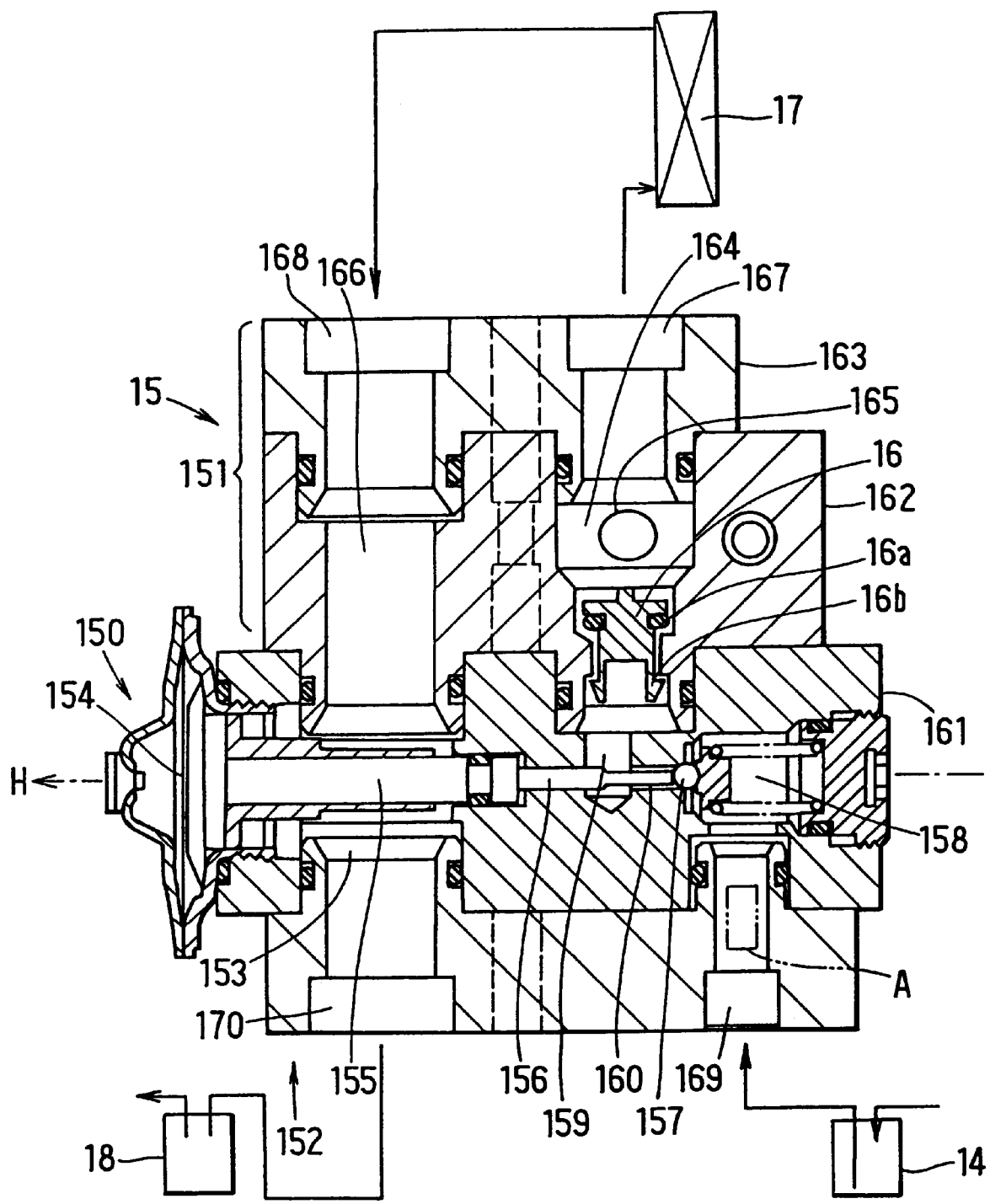
FIG. 18 is a cross-sectional view showing a thermostatic expansion valve in a fourth preferred embodiment.

To the contrary, in the fourth embodiment, the check valve 16 is installed as shown in FIG. 18 so that it is closed by receiving the differential pressure in a direction in which the self-weight of the check valve 16 is applied, thereby improving the sealing strength of the closed check valve 16. Specifically, as shown in FIG. 18, the check valve 16 is installed such that the axis thereof, i.e., a direction in which the check valve 16 moves, becomes perpendicular to the horizontal direction indicated by arrow H. Accordingly, the check valve 16 is closed by moving in a lower direction, in which both the self-weight thereof and the differential pressure ($P_L-P_H$) described above are applied. As a result, the sealing strength of the closed check valve 16 is increased.

(Fifth Embodiment)

Figure 19:
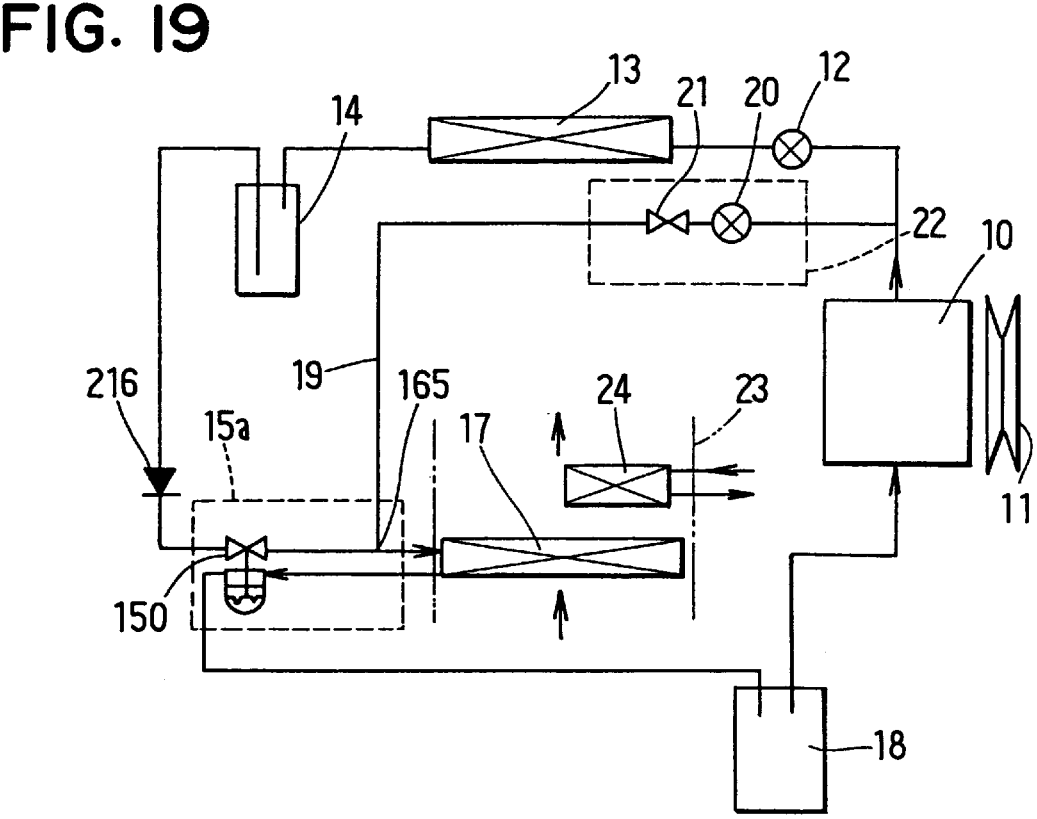
FIG. 19 is a diagram showing a refrigerating cycle system in a fifth preferred embodiment.

In the fourth embodiment, the check valve 16 is included within the first joint 151 of the expansion valve 15. To the contrary, in a fifth preferred embodiment, a check valve 216 is provided independently from a thermostatic expansion valve 15a, for instance, at an upstream side of the expansion valve 15a as shown in FIG. 19.

Figure 20:
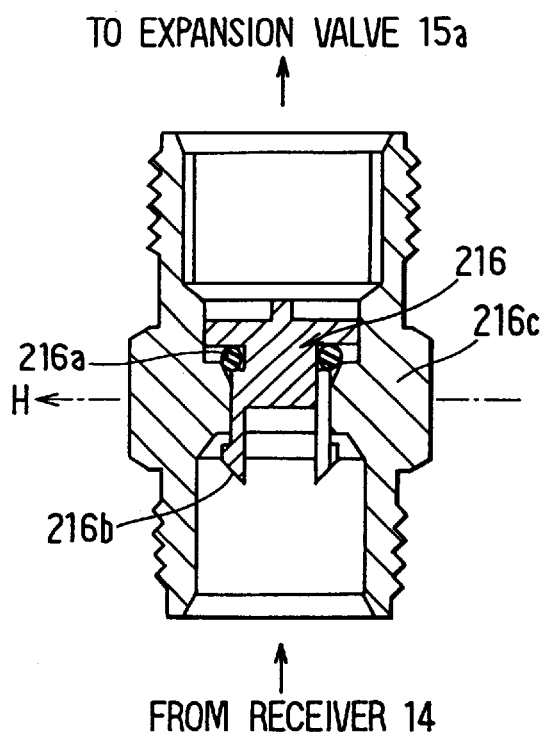
FIG. 20 is a cross-sectional view showing a check valve in the fifth embodiment.

The check valve 216 in the fifth embodiment has a constitution shown in FIG. 20, and is installed such that the axis of the check valve 216 becomes perpendicular to the horizontal direction H. Accordingly, the check valve 216 can be closed by moving in the lower direction, in which the self-weight thereof is applied. In FIG. 20, the check valve 216 composed of a valve member 216b and a sealing member (O-ring) 216a that is disposed on the valve member 216b is perpendicularly installed in a pipe-like housing 216c that has thread portions for connection on an outer circumference surface thereof.

In the fourth and fifth embodiments, the check valves 16, 216 are perpendicularly installed, respectively, so that the self-weights thereof are applied in the same direction as that in which the check valves move; however, it is not always necessary for the check valves to be perpendicularly installed. It is sufficient that the self-weight of the check valve helps to close the check valve itself. Therefore, the axis of the check valve may be inclined with respect to the vertical direction, provided that the self-weight of the check valve has a component which is applied in the direction in which the check valve moves to be closed.

(Sixth Embodiment)

Figure 21:
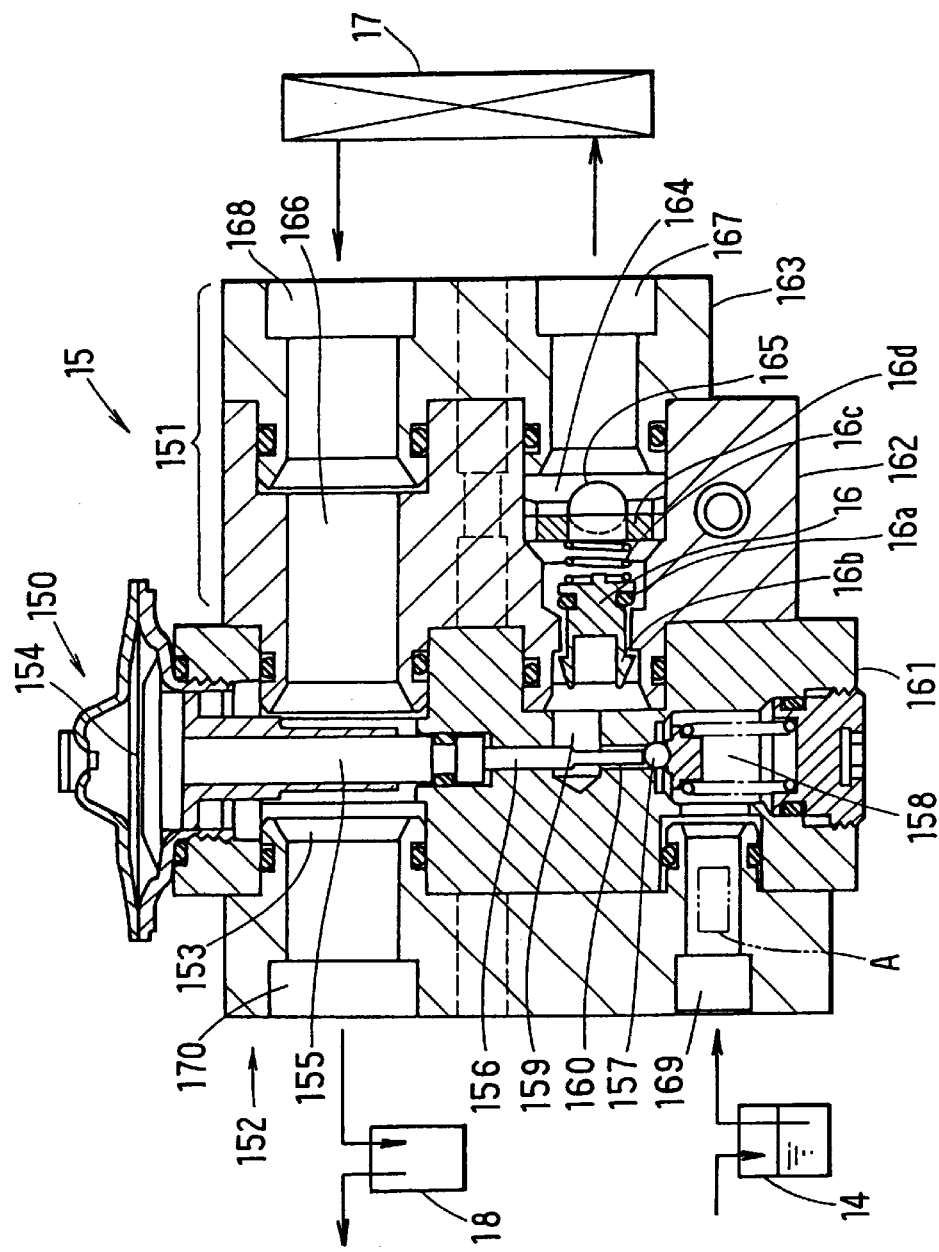
FIG. 21 is a cross-sectional view showing a thermostatic expansion valve integrated with a check valve in a sixth preferred embodiment.

FIG. 21 shows a check valve 16 unified with the expansion valve 15 in a sixth preferred embodiment. The check valve 16 in the sixth embodiment additionally includes a coil spring 16c for closing the check valve 16, and a ring-shaped spring holding plate 16d. Accordingly, the check valve 16 is securely closed by a spring force derived from the coil spring 16c. In the sixth embodiment, it is not necessary to fix the installation direction of the check valve 16 in order to utilize the self-weight of the check valve 16 when the check valve 16 is closed.

In the first to fourth, and sixth embodiments described above, the check valve 16 is included in the first joint 151 of the expansion valve 15 and is positioned at the downstream side immediately after the restriction passage 160 of the expansion valve 15. Alternatively, the check valve 16 may be accommodated in a passage having the joint port 169 of the second joint 152, as indicated by two-dot chain line in FIGS. 11, 18, and 21. That is, the check valve 16 may be positioned at an upstream side immediately before the restriction passage 160 of the expansion valve 15.

In this case, a distance of the check valve 16 from the bypass joint passage 165 is a little increased as compared to those in the above-described embodiments; however, the distance is largely decreased as compared to a case where the check valve 16 is positioned in the high-pressure pipe 28, and therefore refrigerant is prevented from being transformed into liquid in the high-pressure pipe 28. In the embodiments described above, the present invention is applied to the refrigerating cycle for the automotive air conditioner; however, it is apparent that the present invention can be applied to refrigerating cycles for various uses.

(Seventh Embodiment)

Figure 22:
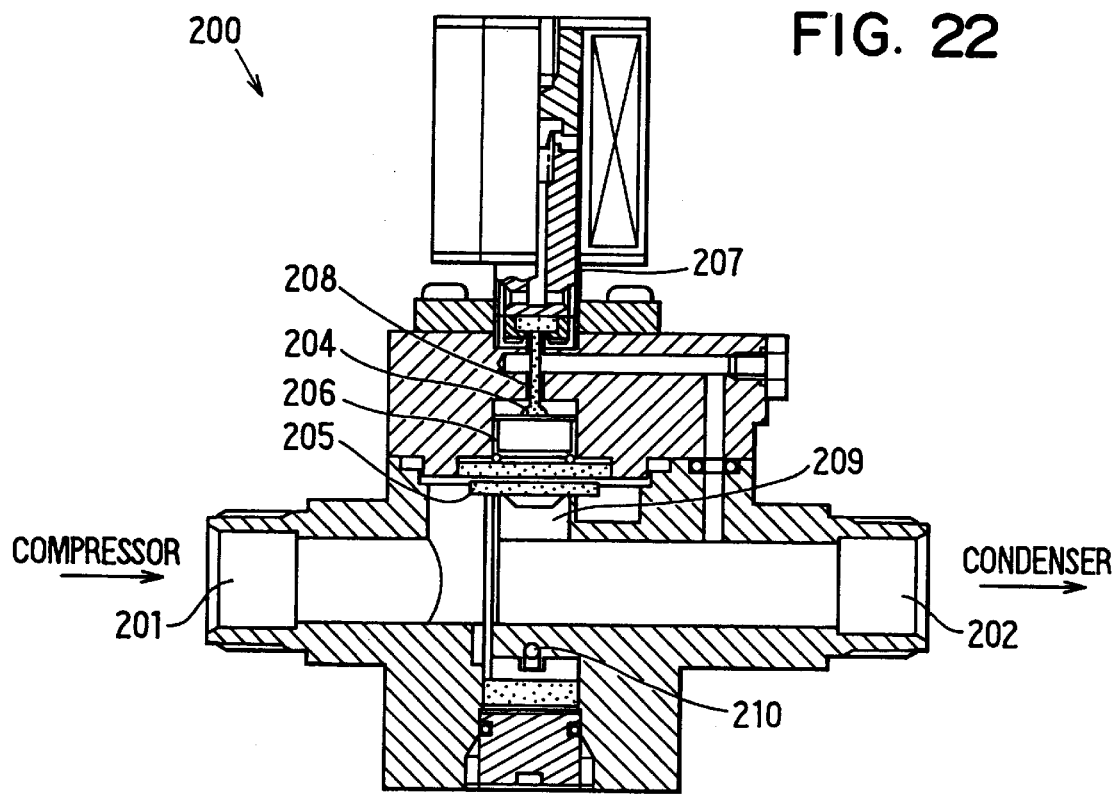
FIG. 22 is a cross-sectional view showing a switch valve in a seventh preferred embodiment.
Figure 23:
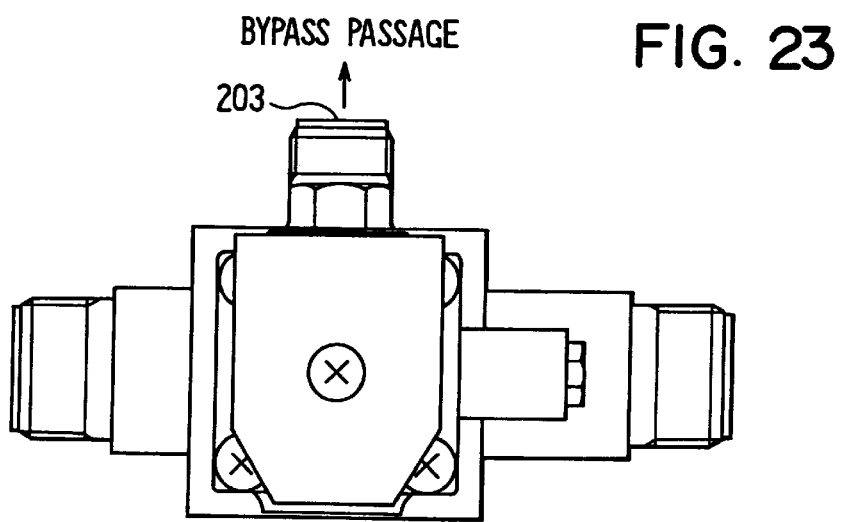
FIG. 23 is a top view showing the switch valve of FIG. 22.

A seventh preferred embodiment adopts a switch valve 200 shown in FIGS. 22 and 23 in which the first and second electromagnetic valves (switch valves) 12, 20 and the throttling part 21 of the bypass passage 19 in FIG. 1 are unified with one another, and which includes one coil comparing to the electromagnetic valve shown in FIG. 10.

An operation of the switch valve (three-direction valve) 200 will be explained. Gaseous refrigerant discharged from the compressor 10 enters a connection part 201, and flows toward a connection part 202 at a cooling mode (cooling operation), and to a connection part 203 at the heating mode (hot-gas operation). When no electricity is supplied to the switch valve 200, a plunger 207 and a pilot valve 204 are positioned at a lower end, and a pilot valve orifice 208 is opened as shown in FIG. 22. Accordingly, a pressure at the connection part 202 is applied to an upper side of a valve 205. On the other hand, a pressure at the connection part 201 is applied to the lower side of the valve 205. Since the pressure at the connection part 201 is usually larger than that at the connection part 202, the valve 25 is displaced upward. Consequently, a passage 209 to the condenser 13 is opened, and a passage 210 to the bypass passage 19 is closed.

When electricity is supplied to the switch valve 200, the plunger 207 and the pilot valve 204 are moved upward by electromagnetic force, so that the pilot valve orifice 208 is closed. Accordingly, the pressure at the upper side of the valve 205 becomes equal to that at the connection part 201. As a result, the valve 25 moves downward, the passage 209 to the condenser 13 is closed, and the passage 210 to the bypass passage 19 is opened.

FIG. 24 is a table indicating switch valve operations. According to the table, the switch valve shown in FIG. 22 cannot provide switch valve operations in which both condenser side and bypass side are opened or are shut. However, in this system, these operations are required only for a case where a volume of the accumulator 18 is small (for instance, less than 300 cc). The switch valve 200 can comply with the accumulator 18 having a volume that is larger than a specific value. Incidentally, when the volume of the accumulator 18 is small, the accumulator 18 may overflow with liquid refrigerant to lose its gas-liquid separation function. In such a case, it is necessary to discharge extra refrigerant toward the condenser 13 by opening both the switch valves 12, 20. On the other hand, when the volume of the accumulator 18 is sufficiently large, the accumulator 18 does not overflow with liquid refrigerant, and the switch valves 12, 20 need not be opened at the same time.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A refrigerating cycle system comprising:
   a compressor for compressing refrigerant and discharging the refrigerant in a gaseous state;
   a condenser for condensing the refrigerant that is discharged from the compressor;
   a first decompressing part for decompressing the refrigerant that is condensed by the condenser;
   a second decompressing part for decompressing the refrigerant that is discharged from the compressor in the gaseous state;
   a valve member for switching refrigerant flows from the compressor into the condenser and from the compressor into the second decompressing part;
   an evaporator for evaporating the refrigerant that is decompressed by one of the first and second decompressing parts; and
   a hot-gas bypass passage directly connecting the compressor and the evaporator while bypassing the condenser, and including the second decompressing member at an inlet thereof on a compressor side.

2. The refrigerating cycle system of claim 1, wherein the refrigerant flows from the compressor into the evaporator through the hot-gas bypass passage at a heating mode.

3. The refrigerating cycle system of claim 1, wherein the valve member includes the second decompressing part and is disposed at the inlet of the hot-gas bypass passage.

4. The refrigerating cycle system of claim 1, further comprising a gas flow noise suppression member that is disposed at an outlet portion of the second decompressing part so that the refrigerant flowing out from the second decompressing part hits against the gas flow noise suppression member as a gas jet flow to reduce noise therefrom.

5. The refrigerating cycle system of claim 1, wherein the hot-gas bypass passage has a first tapered portion at an outlet side of the second decompressing part, the first tapered portion having a cross-sectional area that gradually increases from the second decompressing part.

6. The refrigerating cycle system of claim 5, wherein the hot-gas bypass passage has a second tapered portion at an outlet side thereof, the second tapered portion having a cross-sectional area that gradually increases toward an outlet of the hot-gas bypass passage.

7. The refrigerating cycle system of claim 6, wherein the first and second tapered portions have first and second tapered angles that are less than 12°, respectively.

8. The refrigerating cycle system of claim 1, wherein the hot-gas bypass passage has a tapered portion at an outlet side thereof, the tapered portion having a cross-sectional area that gradually increases toward an outlet of the hot-gas bypass passage.

9. The refrigerating cycle system of claim 1, wherein the hot-gas bypass passage includes a third decompressing part that is provided at a downstream side of the second decompressing part.

10. The refrigerating cycle system of claim 9, wherein the second decompressing part has a restriction hole, and the third decompressing part is a passage having a diameter capable of decompressing the refrigerant.

11. The refrigerating cycle system of claim 10, wherein the valve member is provided at the inlet of the hot-gas bypass passage and includes the restriction hole as the second decompressing part.

12. The refrigerating cycle system of claim 1, further comprising a check valve provided in the first decompressing part, for preventing the refrigerant, which flows out from the hot-gas bypass passage, from reversely flowing toward the condenser.

13. The refrigerating cycle system of claim 12, wherein:
the firs t decompressing part is composed of a device including a restriction passage for decompressing the refrigerant and a joint portion provided at a downstream side of the restriction passage; and
the joint portion includes the check valve therein, a first joint port that is connected to an outlet of the hot-gas bypass passage at a downstream side of the check valve, and a second joint port that is connected to an inlet of the evaporator at a downstream side of the first joint port.

14. The refrigerating cycle system of claim 12, wherein:
the first de compressing part is composed of a device including a restriction passage for decompressing the refrigerant and a joint portion provided at an upstream side of the restriction passage; and
the joint portion includes a joint port that is connected to the condenser for conducting the refrigerant from the condenser into the restriction passage, and the check valve at a downstream side of the joint port.

15. The refrigerating cycle system of claim 12, wherein the check valve is disposed with a moving direction in which the check valve moves to be closed and in which at least part of a self-weight of the check valve is applied.

16. The refrigerating cycle system of claim 1, further comprising a check valve provided at a portion selected from a downstream side immediately after the first decompressing part and an upstream side immediately before the first decompressing part, the check valve being for preventing the refrigerant, which flows out from the hot-gas bypass passage, from reversely flowing toward the condenser.

17. The refrigerating cycle system of claim 16, wherein the check valve is disposed with a moving direction in which the check valve moves to be closed, and in which at least part of a self-weight of the check valve is applied.

18. The refrigerating cycle system of claim 1, wherein the first decompressing part is composed of a thermostatic expansion valve, an opening degree of which is controlled based on an overheating degree of the refrigerant on an outlet side of the evaporator.

19. The refrigerating cycle system of claim 1, wherein:
the evaporator is accommodated in an air conditioning unit that is disposed within a compartment of a vehicle; and
the second decompressing part is disposed within an engine room of the vehicle.

20. The refrigerating cycle system of claim 19, wherein:
the compressor is disposed within the engine room, and is driven by an engine of the vehicle; and
the hot-gas bypass passage is disposed at a position to which heat is transmitted from the engine.

21. A refrigerating cycle system comprising:
a compress or for compressing refrigerant and discharging the refrigerant;
a condenser for condensing the refrigerant that is discharged from the compressor;
a first decompressing part for decompressing the refrigerant that is condensed by the condenser;
a second decompressing part for decompressing the refrigerant that is discharged from the compressor;
a valve member for switching refrigerant flows from the compressor into the condenser and from the compressor into the second decompressing part;
an evaporator for evaporating the refrigerant that is decompressed by one of the first and second decompressing parts;
a connection passage connecting the first decompressing part and the evaporator;
a hot-gas bypass passage connecting the second decompressing part and the connection passage for directly conducting the refrigerant from the compressor into the evaporator.

22. The refrigerating cycle system of claim 21, wherein the hot-gas bypass passage additionally decompresses the refrigerant that is decompressed by the second decompressing part.

23. The refrigerating cycle system of claim 21, further comprising a check valve provided in the connection passage, for preventing the refrigerant, which flows out from the hot-gas bypass passage, from reversely flowing toward the condenser, wherein
the first decompressing part is composed of an expansion valve; and
the check valve is unified with the expansion valve.

24. The refrigerating cycle system of claim 23, wherein the check valve is disposed with a moving direction in which the check valve moves to be closed, the moving direction being approximately perpendicular to a horizontal direction.

* * * * *